US011076131B2

(12) United States Patent
Yamagaki et al.

(10) Patent No.: US 11,076,131 B2
(45) Date of Patent: Jul. 27, 2021

(54) VIDEO COLLECTION SYSTEM, VIDEO COLLECTION SERVER, VIDEO COLLECTION METHOD, AND PROGRAM

(71) Applicant: NEC CORPORATION, Tokyo (JP)

(72) Inventors: Norio Yamagaki, Tokyo (JP); Dai Kanetomo, Tokyo (JP); Hiroaki Aminaka, Tokyo (JP); Kazushi Muraoka, Tokyo (JP); Taichi Ohtsuji, Tokyo (JP); Takashi Yoshinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/472,622

(22) PCT Filed: Feb. 22, 2017

(86) PCT No.: PCT/JP2017/006654
§ 371 (c)(1),
(2) Date: Jun. 21, 2019

(87) PCT Pub. No.: WO2018/116485
PCT Pub. Date: Jun. 28, 2018

(65) Prior Publication Data
US 2019/0364249 A1    Nov. 28, 2019

Related U.S. Application Data

(60) Provisional application No. 62/437,776, filed on Dec. 22, 2016.

(51) Int. Cl.
*H04N 21/654* (2011.01)
*H04N 7/18* (2006.01)

(52) U.S. Cl.
CPC ........... *H04N 7/181* (2013.01); *H04N 21/654* (2013.01)

(58) Field of Classification Search
None
See application file for complete search history.

(56) References Cited

U.S. PATENT DOCUMENTS

| | | | |
|---|---|---|---|
| 7,450,735 B1 * | 11/2008 | Shah ...................... | G06T 7/292 348/143 |
| 2004/0252194 A1 * | 12/2004 | Lin ......................... | H04N 7/181 348/169 |

(Continued)

FOREIGN PATENT DOCUMENTS

| | | | |
|---|---|---|---|
| JP | 2001-306739 A | 11/2001 | |
| JP | 2004-274309 A | 9/2004 | |

(Continued)

OTHER PUBLICATIONS

International Search Report for PCT/JP2017/006654, dated May 9, 2017.

*Primary Examiner* — Christopher G Findley
(74) *Attorney, Agent, or Firm* — Sughrue Mion, PLLC

(57) ABSTRACT

A video collection system includes: a plurality of terminals; and a video collection server that requests at least one of the plurality of terminals to perform information provision. The video collection server includes a calculation part, a determination part, and a request part. The calculation part calculates, based on information acquired from a camera(s), a first area(s) imaged by the camera(s). The determination part determines a second area(s) as an information provision target(s) based on a location(s) of the first area(s). The request part selects, based on respective locations of the plurality of terminals and a location(s) of the second area(s), a terminal(s) to be requested to perform the information provision from the plurality of terminals and requests the selected terminal(s) to provide video data of the second area(s).

16 Claims, 30 Drawing Sheets

(56) References Cited

U.S. PATENT DOCUMENTS

| | | | | |
|---|---|---|---|---|
| 2010/0157064 A1* | 6/2010 | Cheng | ................... | H04N 5/247 |
| | | | | 348/169 |
| 2011/0157368 A1* | 6/2011 | Jo | ......................... | H04N 7/181 |
| | | | | 348/159 |
| 2011/0181712 A1* | 7/2011 | You | ................... | G08B 13/1618 |
| | | | | 348/135 |
| 2016/0165193 A1* | 6/2016 | Rasheed | ............... | H04N 7/188 |
| | | | | 348/143 |

FOREIGN PATENT DOCUMENTS

| | | | |
|---|---|---|---|
| JP | 2006-235865 | A | 9/2006 |
| JP | 2009-212701 | A | 9/2009 |
| JP | 2010-135889 | A | 6/2010 |
| JP | 2012-169986 | A | 9/2012 |
| JP | 2013-192029 | A | 9/2013 |
| JP | 5306660 | B2 | 10/2013 |

* cited by examiner

FIG. 6

| CAMERA | VIDEO DATA | LOCATION | DIRECTION |
|---|---|---|---|
| FIXED CAMERA10-1 | F_10-1 | (X1, Y1) | SOUTH EAST |
| FIXED CAMERA10-2 | F_10-2 | (X2, Y2) | EAST |
| ... | ... | ... | ... |
| MOBILE CAMERA 20-1 | F-20-1 | (X3, Y3) | NORTH EAST |
| ... | ... | ... | ... |

FIG. 7

| TERMINAL | LOCATION |
|---|---|
| TERMINAL 30-1 | (X11, Y11) |
| TERMINAL 30-2 | (X12, Y12) |
| ... | ... |

FIG. 12
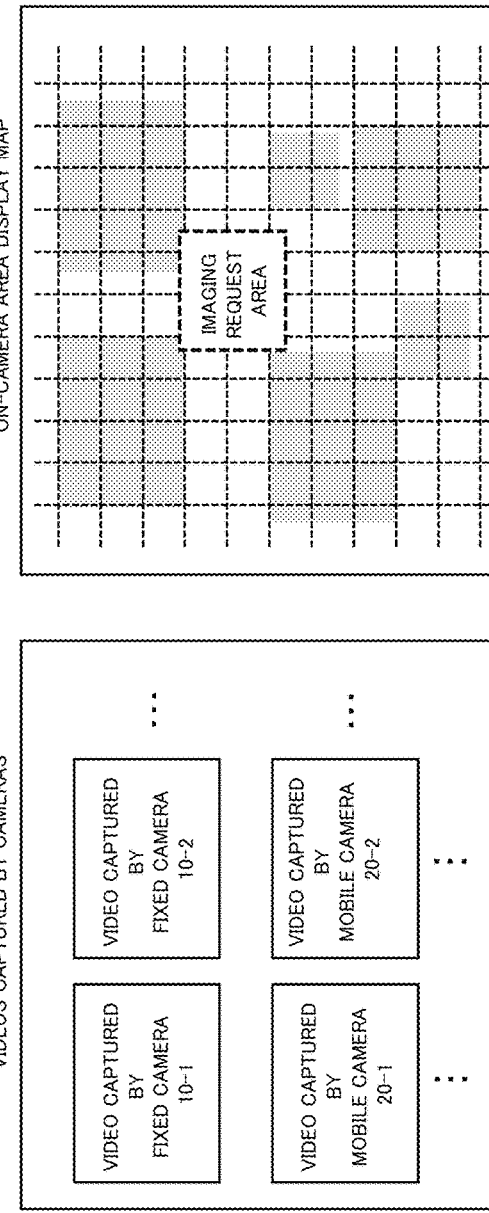
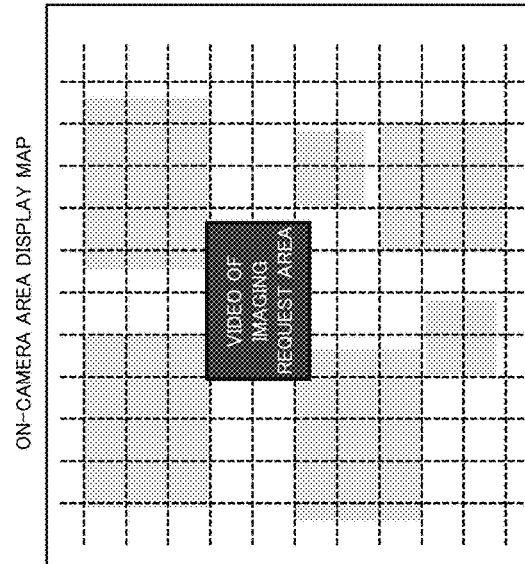

FIG. 18
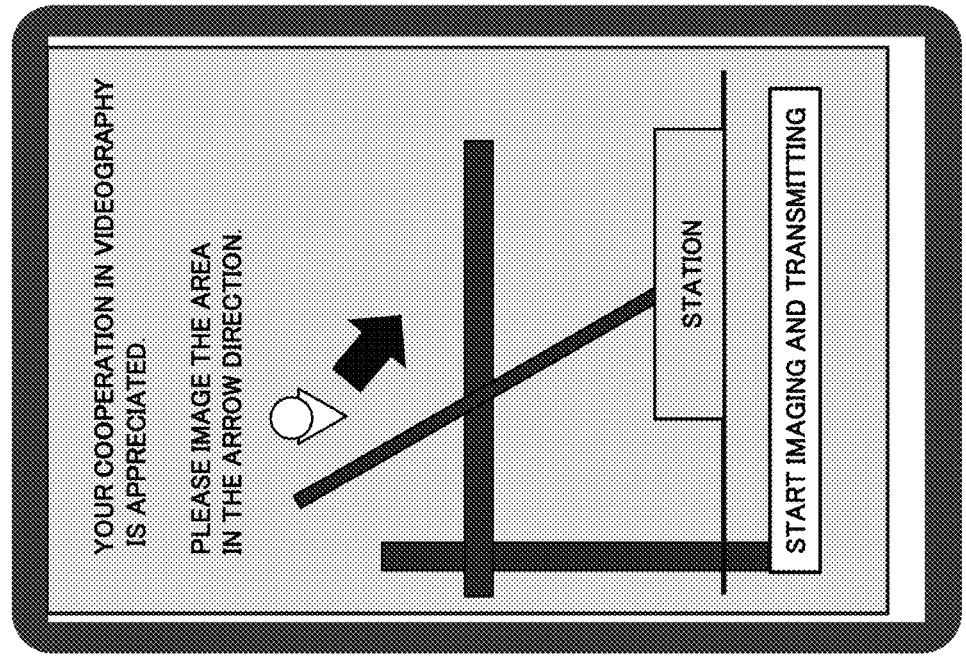
(b)
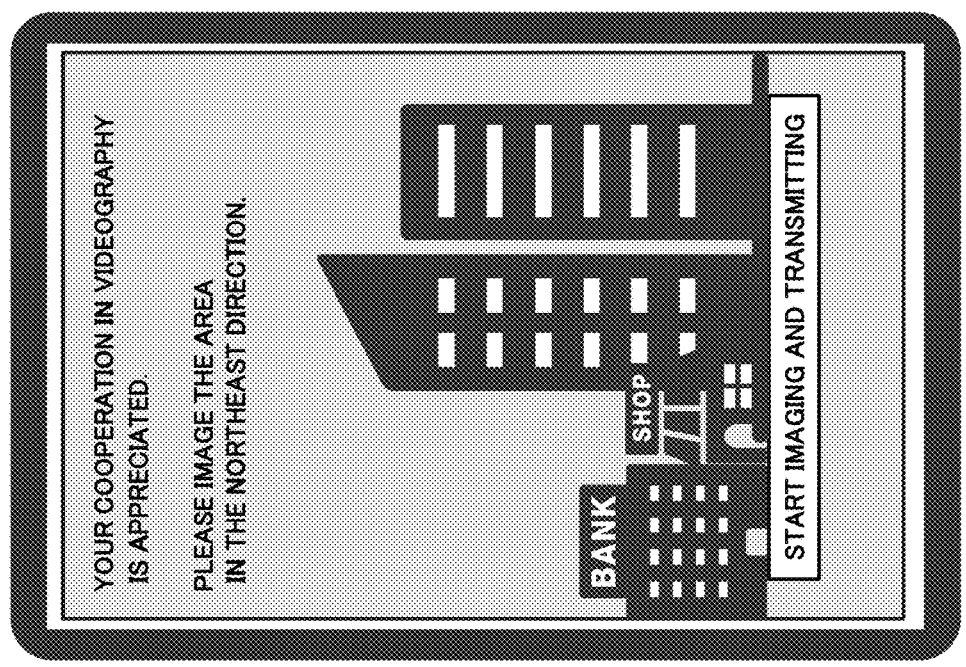
(a)

FIG. 19
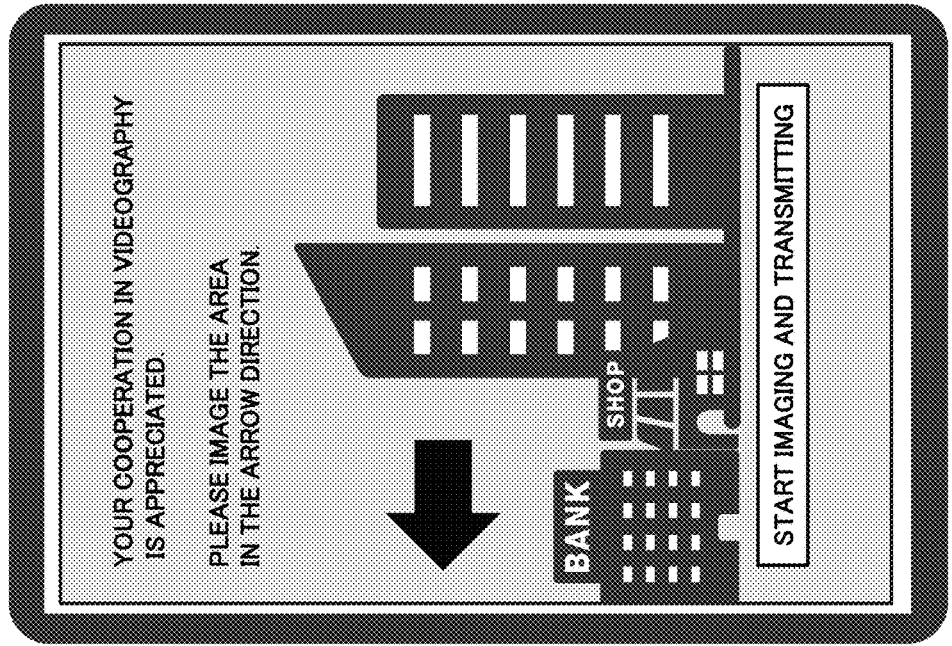
(b)
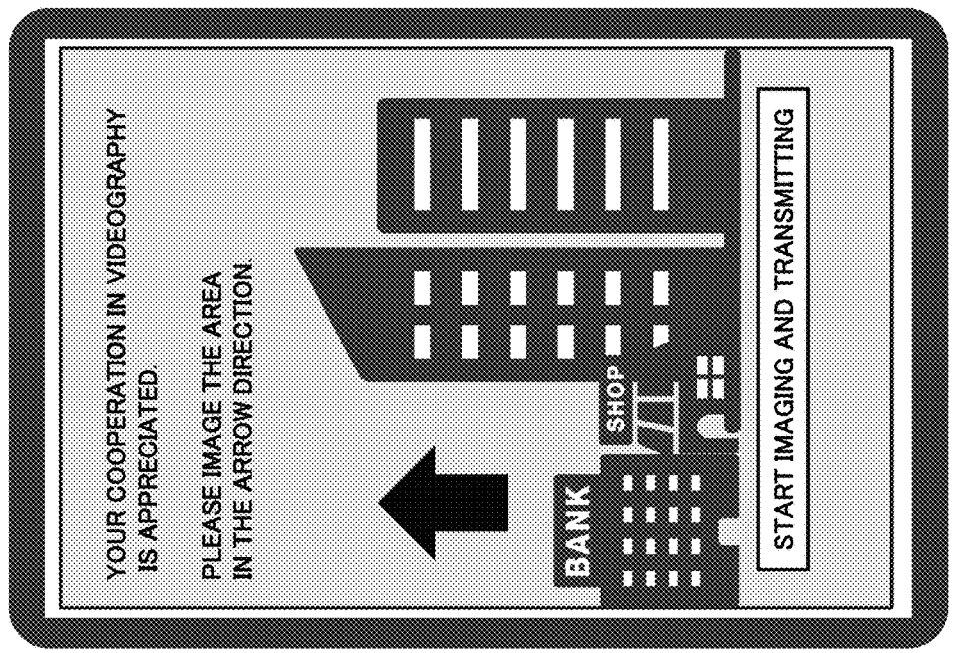
(a)

VIDEO COLLECTION SYSTEM, VIDEO COLLECTION SERVER, VIDEO COLLECTION METHOD, AND PROGRAM

REFERENCE TO RELATED APPLICATION

This Application is a National Stage of International Application No. PCT/JP2017/06654 filed Feb. 22, 2017, claiming priority based on U.S. provisional application No. 62/437,776, filed on Dec. 22, 2016, the disclosure of which is incorporated herein in its entirety by reference thereto.

FIELD

The present invention relates to a video collection system, a video collection server, a video collection method, and a program.

BACKGROUND

In recent years, the terrorism threat has increased, and the security at large-scale events, etc. where many people gather tends to be tightened year after year. For example, a security operation at an event site is performed by monitoring videos captured by cameras fixedly installed at the event site and videos captured by wearable cameras held by security guards.

In addition, provision of high-quality security services using ICT (Information and Communication Technology) is expected. Namely, actively using ICT, in addition to people monitoring videos acquired by monitoring cameras, etc., is expected to contribute to tightened security. For example, there has been a discussion on use of a system in which a face recognition technique, etc. are introduced. In this system, a suspicious person is quickly detected by checking the face images captured by monitoring cameras against the face images registered in a database about criminals.

PTL 1 discloses a method and a system for reporting a request of help. PTL 1 is directed to promptly giving help to a requester asking for help. According to the technique in PTL 1, people who can cooperate in help previously register their profiles such as kinds of help or communication destination information (contact information) in a helper database in the system. In addition, according to the technique in this literature, a requester accesses this help request reporting system with his/her portable phone. Next, the requester searches the helper database for an appropriate helper by notifying the system of GPS (Global Positioning System) information and a help content and notifies the helper of his/her location.

PTL 2 discloses a technique of having a requester supply a requester ID on an IC card or the like to a read terminal to acquire the location information of the requester and determining the help content needed by the requester from a previously registered database. In addition, according to the technique in this literature, the determined help request instruction, location information, and information about the requester are supplied to a portable terminal held by a person in charge of help, and the requester is helped. In addition, according to the technique in this literature, by installing a camera in an ID read terminal of a requester, a photograph of the face of this requester can be supplied, and an appropriate helper is selected by collecting the location information and the current situations of helpers from terminals held by the helpers.

PTL 3 discloses a technique that realizes a higher level of security by using information other than information acquired by monitoring by a home security system installed at an individual house. According to the technique in this literature, when a home security system determines that an abnormality has occurred at a corresponding house, a vehicle driving around the house (and a home security system of a different house) is instructed to capture and transmit an image.

PTL 1: Japanese Patent Kokai Publication No. JP-2001-306739A
PTL 2: Japanese Patent Kokai Publication No. JP-2006-235865A
PTL 3: Japanese Patent No. 5306660

SUMMARY

In a security service (a security operation) provided by a security company, etc., it is necessary to promptly and accurately understand the situation in the event area at a remote command post (an operation center, etc.). In addition, depending on the situation in the event area, appropriate judgements (for example, instructions to a person in charge of the security at the site) need to be made. In this case, it is necessary to transmit information about the situation at the site (a video representing the situation at the site) in the entire range of the event area (throughout the event area) to the remote command post and make the entire site "visible".

However, fixed cameras could not be installed at some places, and a sufficient number of security guards could not be provided with wearable cameras. Thus, it is difficult to monitor every corner of the event area. In addition, when there are no monitoring cameras around the location of a crime or an accident that has occurred, it is difficult to accurately and promptly understand the situation at the site.

The techniques disclosed in PTLs 1 to 3 cannot solve the above problem.

According to the technique disclosed in PTL 1, a person (a terminal) that actually provides help is determined from the helpers previously registered in a database or people having a terminal with a certain function. Thus, it is necessary to previously register helpers in a database, and the location information of the helpers is not considered in this literature. Thus, a helper is notified only when a requester asks for help. Namely, this literature does not disclose a method for responding to change of the area where help is needed and responding to helpers coming from outside the area, when help is needed continuously. Thus, in PTL 1, requesting many people (terminals) in a certain area for help is not considered.

In addition, since the technique in PTL 2 assumes that a person requests help, a person (a terminal) who provides help is determined when the requester accesses the system to request help. Thus, the helper is notified only when the requester asks for help. Namely, this literature does not disclose a method for responding to change of the area where help is needed and responding to helpers coming from outside the area, when help is needed continuously. Thus, PTL 2 does not disclose how to respond to expansion or reduction of the area whose situation needs to be checked depending on the situation of a crime or an accident.

PTL 3 discloses a method for requesting a camera in an area where a video needs to be captured to perform imaging. However, in this literature, since a vehicle driving around the monitoring target or a camera at a different house is requested to perform imaging, the imaging direction and area are fixed. Namely, according to this literature, only a certain area can be imaged. Specifically, a camera installed at a driving vehicle can only capture a video in its travelling direction, and a camera in a home security system can only capture a video in a certain range. Thus, since the area whose situation needs to be checked varies, the direction and area in which a video needs to be captured (the situation needs to be checked) also change. However, the technique in PTL 3 cannot respond to this change.

It is an object of the present invention to provide a video collection system, a video collection server, a video collection method, and a program that collect a video(s) necessary to understand a current situation(s) of a monitoring target area(s).

According to a first aspect of the present invention, there is provided a video collection system, including: a plurality of terminals; and a video collection server that requests at least one of the plurality of terminals to perform information provision; wherein the video collection server includes: a calculation part that calculates, based on information acquired from a camera(s), a first area(s) imaged by the camera(s); a determination part that determines a second area(s) as an information provision target(s) based on a location(s) of the first area(s); and a request part that selects, based on respective locations of the plurality of terminals and a location(s) of the second area(s), a terminal(s) to be requested to perform the information provision from the plurality of terminals and requests the selected terminal(s) to provide video data of the second area(s).

According to a second aspect of the present invention, there is provided a video collection server, which requests at least one of a plurality of terminals to perform information provision, the video collection server including: a calculation part that calculates, based on information acquired from a camera(s), a first area(s) imaged by the camera(s); a determination part that determines a second area(s) as an information provision target(s) based on a location(s) of the first area(s); and a request part that selects, based on respective locations of the plurality of terminals and a location(s) of the second area(s), a terminal(s) to be requested to perform the information provision from the plurality of terminals and requests the selected terminal(s) to provide video data of the second area(s).

According to a third aspect of the present invention, there is provided a video collection method, including: calculating, based on information acquired from a camera(s), a first area(s) imaged by the camera(s); determining a second area(s) as a target(s) used when at least one of a plurality of terminals is requested to perform information provision based on a location(s) of the first area(s); selecting, based on respective locations of the plurality of terminals and a location(s) of the second area(s), a terminal(s) to be requested to perform the information provision from the plurality of terminals; and requesting the selected terminal(s) to provide video data of the second area(s).

According to a fourth aspect of the present invention, there is provided a program, causing a computer to perform processing for: calculating, based on information acquired from a camera(s), a first area(s) imaged by the camera(s); determining a second area(s) as a target(s) used when at least one of a plurality of terminals is requested to perform information provision based on a location(s) of the first area(s); selecting, based on respective locations of the plurality of terminals and a location(s) of the second area(s), a terminal(s) to be requested to perform the information provision from the plurality of terminals; and requesting the selected terminal(s) to provide video data of the second area(s).

This program can be stored in a computer-readable storage medium. The storage medium may be a non-transient storage medium such as a semiconductor memory, a hard disk, a magnetic storage medium, or an optical storage medium. The present invention may be implemented as a computer program product.

According to an individual aspect of the present invention, there are provided a video collection system, a video collection server, a video collection method, and a program that contribute to collecting a video(s) necessary to understand a current situation(s) of a monitoring target area(s).

BRIEF DESCRIPTION OF DRAWINGS

FIG. 6 illustrates an example of table information for managing video data stored in a storage medium.

FIG. 7 illustrates an example of location information of terminals.

FIG. 12 illustrates an operation of the video collection system according to the first exemplary embodiment.

FIG. 18 illustrates operations of the imaging request part according to the fourth exemplary embodiment.

FIG. 19 illustrates operations of the imaging request part according to the fourth exemplary embodiment.

PREFERRED MODES

Figure 1:
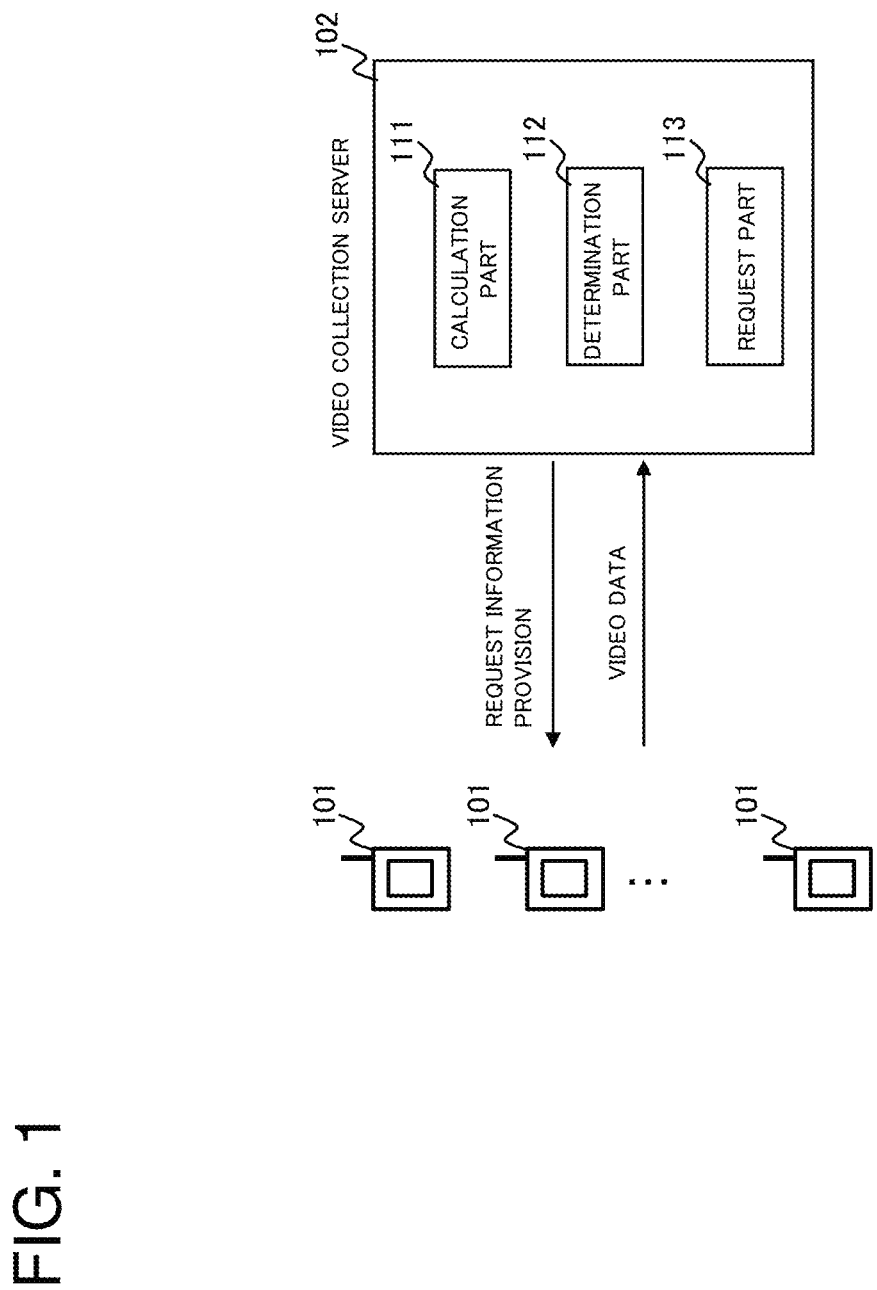
FIG. 1 illustrates an outline of an exemplary embodiment.

First, an outline of an exemplary embodiment will be described. FIG. 1 illustrates an outline of an exemplary embodiment. The reference characters in the following outline denote various elements for the sake of convenience and are used as examples to facilitate understanding of the present invention. Namely, the description of the outline is not intended to indicate any limitations.

A video collection system according to an exemplary embodiment includes a plurality of terminals 101 and a video collection server 102 that requests at least one of the plurality of terminals 101 to perform information provision (see FIG. 1). The video collection server 102 includes a calculation part 111, a determination part 112, and a request part 113. The calculation part 111 calculates, based on information acquired from a camera(s), a first area(s) (for example, an on-camera area(s), which will be described below) imaged by the camera(s). The determination part 112 determines a second area(s) (for example, an imaging request area(s), which will be described below) as an information provision target(s), based on a location(s) of the first area(s). The request part 113 selects, based on locations of the plurality of terminals 101 and a location(s) of the second area(s), a terminal(s) 101 requested to perform the information provision from the plurality of terminals 101 and requests the selected terminal(s) 101 to provide video data of the second area(s).

In an event area or the like as a monitoring target, the place that a person in charge (an operator) of the police or a security company wishes to check in detail changes from hour to hour. When a crime or an accident occurs, the operator wishes to understand the details at the location of the event. In such cases, the above video collection system requests the terminals 101 held by many people (for example, citizens such as volunteers) in the event area to provide video data necessary to understand the situation at the site. Since the video collection server 102 provides the video data collected based on the requests to the operator or the like, the operator can obtain a video(s) necessary to understand the current situation of the monitoring target.

In this way, the video collection system according to the exemplary embodiment requests many people (more accurately, terminals owned by many people) in a certain area(s) (a monitoring target area(s)) for help. Thus, even when an area (an area whose situation needs to be checked) changes (moves, expands, or reduces) with the situation of a crime, an accident, or the like, the video collection system according to the exemplary embodiment can flexibly respond to this change. In addition, in the video collection system according to the exemplary embodiment, since a person(s) such as a volunteer(s) is requested to image the site whose situation needs to be checked in detail, a circumstance where imaging cannot be performed at a certain angle does not occur.

Hereinafter, specific exemplary embodiments will be described in detail with reference to drawings. In the following exemplary embodiments, like elements are denoted by like reference characters, and description thereof will be omitted. An individual connection line between blocks in an individual drawing signifies both one-way and two-way directions. An individual arrow schematically illustrates the principal flow of a signal (data) and does not exclude bidirectionality.

First Exemplary Embodiment

A first exemplary embodiment will be described in detail with reference to drawings.

Figure 2:
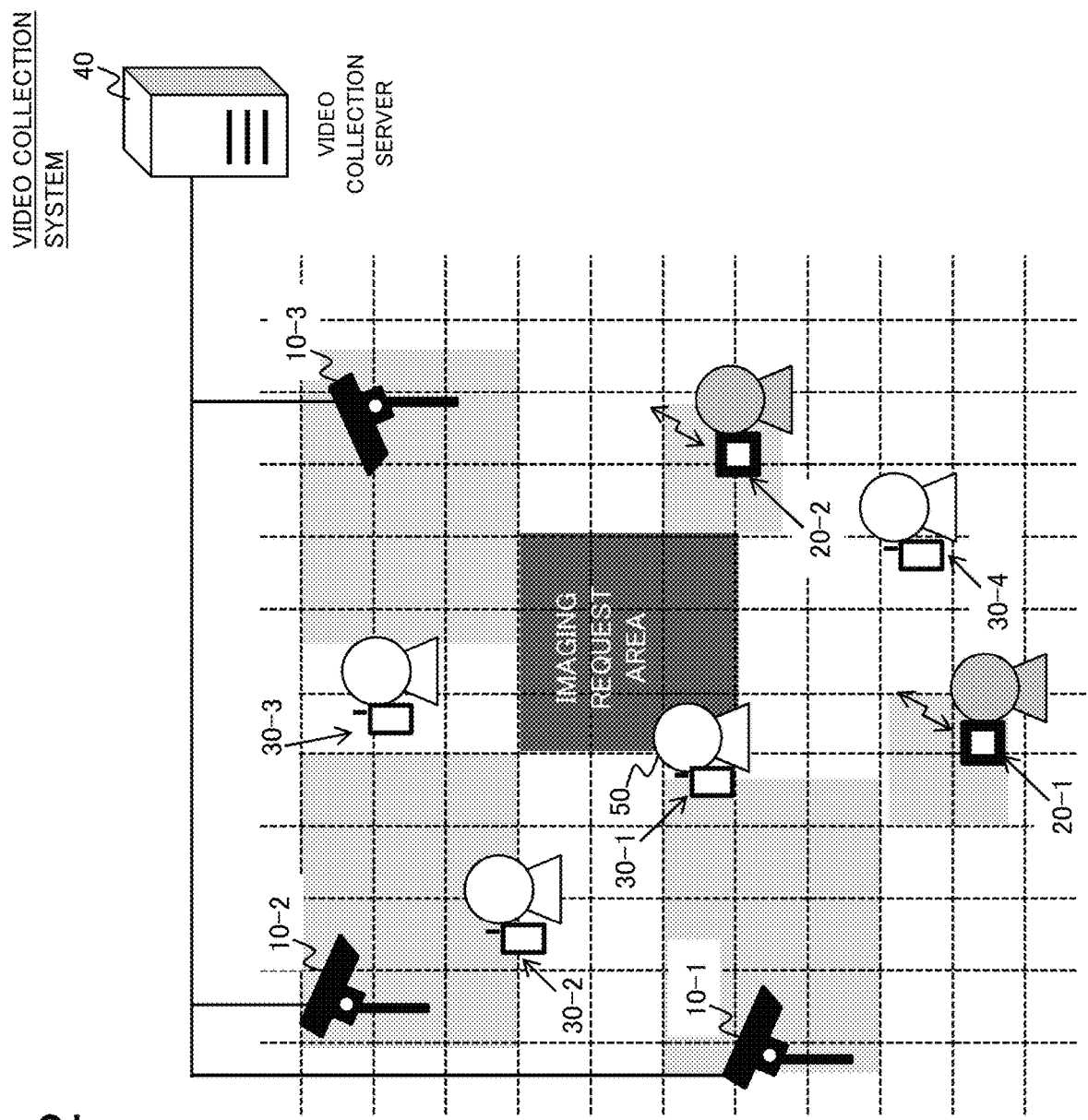
FIG. 2 illustrates an example of a configuration of a video collection system according to a first exemplary embodiment.

FIG. 2 illustrates an example of a configuration of a video collection system according to the first exemplary embodiment. As illustrated in FIG. 2, the video collection system includes a plurality of fixed cameras 10-1 to 10-3, a plurality of mobile cameras 20-1 and 20-2, a plurality of terminals 30-1 to 30-4, and a video collection server (a video collection control server) 40.

Hereinafter, unless there is a particular reason to distinguish the fixed cameras 10-1 to 10-3 from each other, these fixed cameras 10-1 to 10-3 will simply be referred to as "fixed camera(s) 10". Likewise, unless there is a particular reason to distinguish the mobile cameras and the terminals, the mobile cameras and the terminals will simply be referred to as "mobile camera(s) 20" and "terminal(s) 30". In addition, while FIG. 2 illustrates three fixed cameras 10, two mobile cameras 20, and four terminals 30, the numbers of cameras and the like are not limited to these numbers.

The fixed cameras 10 are cameras that are fixedly installed at a video collection area (namely, a monitoring target area) such as an event site. The fixed cameras 10 are so-called monitoring cameras.

The mobile cameras 20 are cameras that are held by security guards or the like patrolling the monitoring target area. The mobile cameras 20 are devices referred to as so-called wearable cameras. In principle, the fixed cameras 10 are installed comprehensively in the monitoring target area(s). However, there are places, situations, etc. where it is difficult to install the fixed cameras 10. To enable imaging at such places, the mobile cameras 20 are used. Namely, the mobile camera(s) 20 are used to complement the imaging range(s) of the fixed cameras 10.

An individual one of the fixed cameras 10 and the mobile cameras 20 has an imaging range based on its own specifications. For example, in FIG. 2, the ranges in which the cameras 10 and the mobile cameras 20 can perform imaging are indicated in light gray.

An individual one of the fixed cameras 10 and the mobile cameras 20 is connected to the video collection server 40 via a wired or wireless network. An individual one of the fixed cameras 10 and the mobile cameras 20 outputs its own imaging data (image data or video data) to the video collection server 40. The video data can be deemed as a collection of a plurality of chronologically continuous image data. Thus, in the disclosure of the present application, while data acquired by imaging of an individual camera will be referred to as video data, needless to say, the individual camera may output image data in place of video data.

The video collection server 40 is an apparatus that is installed at an operation center or the like of the police or a security company. The video collection server 40 outputs the collected video data to a monitor(s) or the like at the operation center. An operator at the operation center monitors the videos (the current situation at the monitoring target area) outputted by the video collection server 40. If the operator recognizes an abnormality in the monitoring target area, the operator takes necessary measures. For example, the operator instructs a security guard(s) at the site to respond to the abnormal situation.

In addition, the video collection server 40 calculates, based on the video data acquired from the fixed cameras 10 and the mobile cameras 20, the areas (the areas viewable by the operator) imaged by these cameras in the monitoring target area. Hereinafter, the areas calculated by the video collection server 40 will be referred to as "on-camera areas". For example, in the example in FIG. 2, the areas in light gray in the monitoring target area are the "on-camera areas". The on-camera areas calculated by the video collection server 40 are provided to the operator at the operation center.

Since the imaging locations of the mobile cameras 20 change as the respective security guards move, the video collection server 40 regularly updates the on-camera areas and provides the updated on-camera areas to the operator. Based on the information (the videos of the cameras, namely, the on-camera areas) provided by the video collection server 40, the operator determines an area that the operator wishes to check in detail in the monitoring target area and enters information about this area to the video collection server 40. Hereinafter, the area that needs to be checked by the operator will be referred to as an "imaging request area". For example, in the example in FIG. 2, the area in dark gray in the monitoring target area is the imaging request area.

When the operator enters an imaging request area, the video collection server 40 requests at least one of the plurality of terminals 30 to provide information about the imaging request area. More specifically, the video collection server 40 requests a person(s) in the monitoring target area to image the imaging request area. When the monitoring target area is a large sports event area or the like, the person(s) requested to image the imaging request area is, for example, a volunteer(s) who supports this event. The person(s) requested to image the imaging request area images the imaging request area by using his(their) own terminal(s) 30 and transmits the video data to the video collection server 40. For example, in the example in FIG. 2, the video collection server 40 requests the terminal 30-1 held by a person 50 to image the imaging request area (transmit the video data).

The video collection server 40 provides the acquired video of the imaging request area to the operator. The operator checks the video and takes necessary measures.

Hereinafter, individual apparatuses for realizing functions of the video collection system will be described.

[Hardware Configuration]

First, hardware configurations of the individual apparatuses that configure the video collection system according to the first exemplary embodiment will be described.

Figure 3:
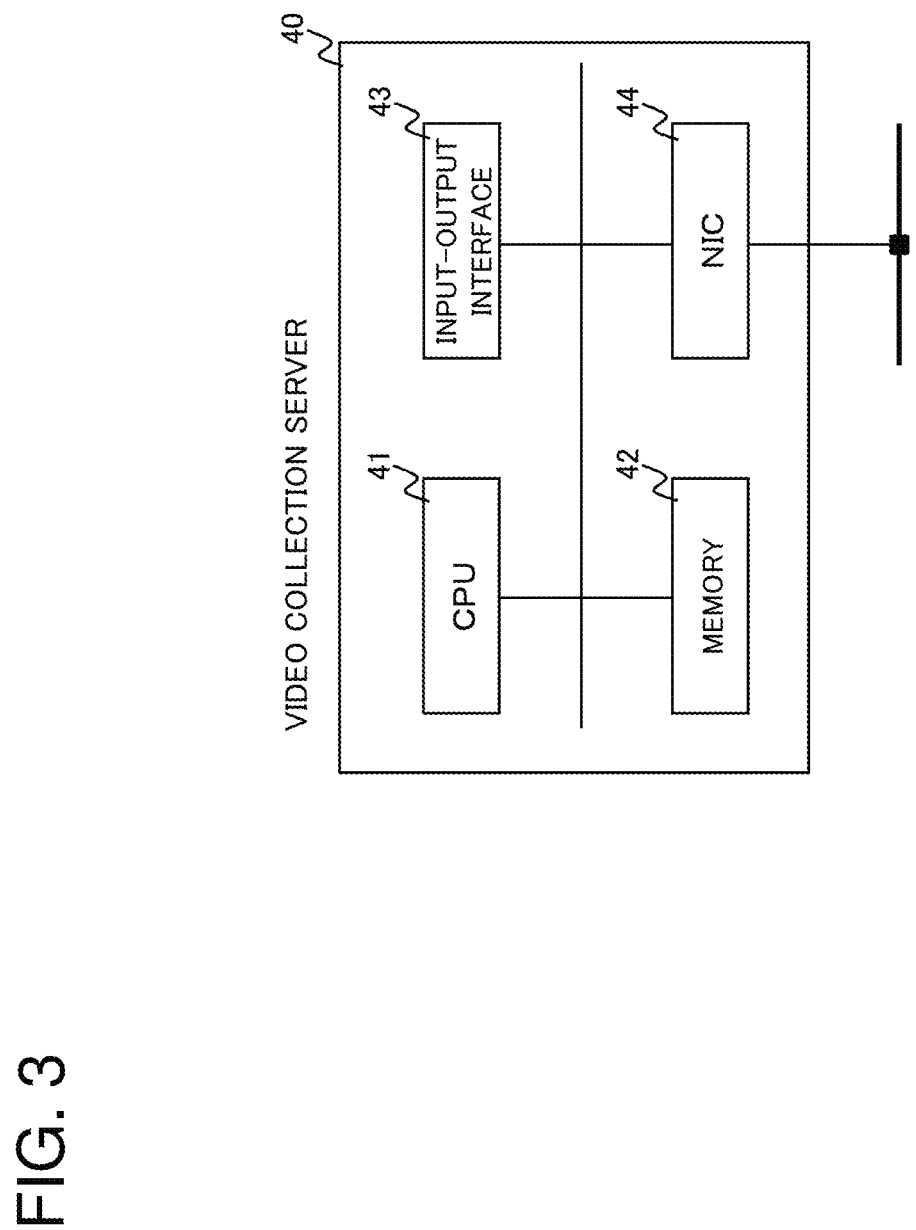
FIG. 3 is a block diagram illustrating an example of a hardware configuration of a video collection server according to the first exemplary embodiment.

FIG. 3 is a block diagram illustrating an example of a hardware configuration of the video collection server 40 according to the first exemplary embodiment. The video collection server 40 can be constituted as a so-called computer (an information processing apparatus) and has a configuration illustrated as an example in FIG. 3. For example, the video collection server 40 includes a CPU (Central Processing Unit) 41, a memory 42, an input-output interface 43, and a NIC (Network Interface Card) 44 serving as a communication interface that are connected to each other via an internal bus.

The hardware configuration of the video collection server 40 is not limited to the configuration illustrated in FIG. 3. The video collection server 40 may include hardware not illustrated or may not include the input-output interface 43 when appropriate. For example, when an operation terminal connected by a network is used to exchange information with the video collection server 40, there are cases in which the input-output interface 43 is not needed. In addition, for example, the number of CPUs included in the video collection server 40 is not limited to the example illustrated in FIG. 3. For example, a plurality of CPUs may be included in the video collection server 40.

The memory 42 is a RAM (Random Access Memory), a ROM (Read-Only Memory), or an auxiliary storage device (a hard disk, etc.).

The input-output interface 43 is an interface for a display apparatus or an input apparatus not illustrated. The display apparatus is, for example, a liquid crystal display or the like. The input apparatus is, for example, an apparatus that receives user operations such as a keyboard or a mouse or an apparatus that receives information from an external storage device such as a USB (Universal Serial Bus) memory. The user enters necessary information to the video collection server 40 by using a keyboard, a mouse, etc.

Functions of the video collection server 40 are realized by processing modules that will be described below. The processing modules are realized by, for example, causing the CPU 41 to execute a program stored in the memory 42. In addition, this program can be updated by downloading an updated program via a network or by using a storage medium holding an updated program. The above processing modules may be realized by a semiconductor chip. Namely, the functions of the processing modules are realized by using hardware and/or software.

By installing the above computer program in a storage part of a computer, the computer can serve as the video collection server 40. In addition, by causing a computer to execute the above computer program, the computer can perform a video collection method.

Figure 4:
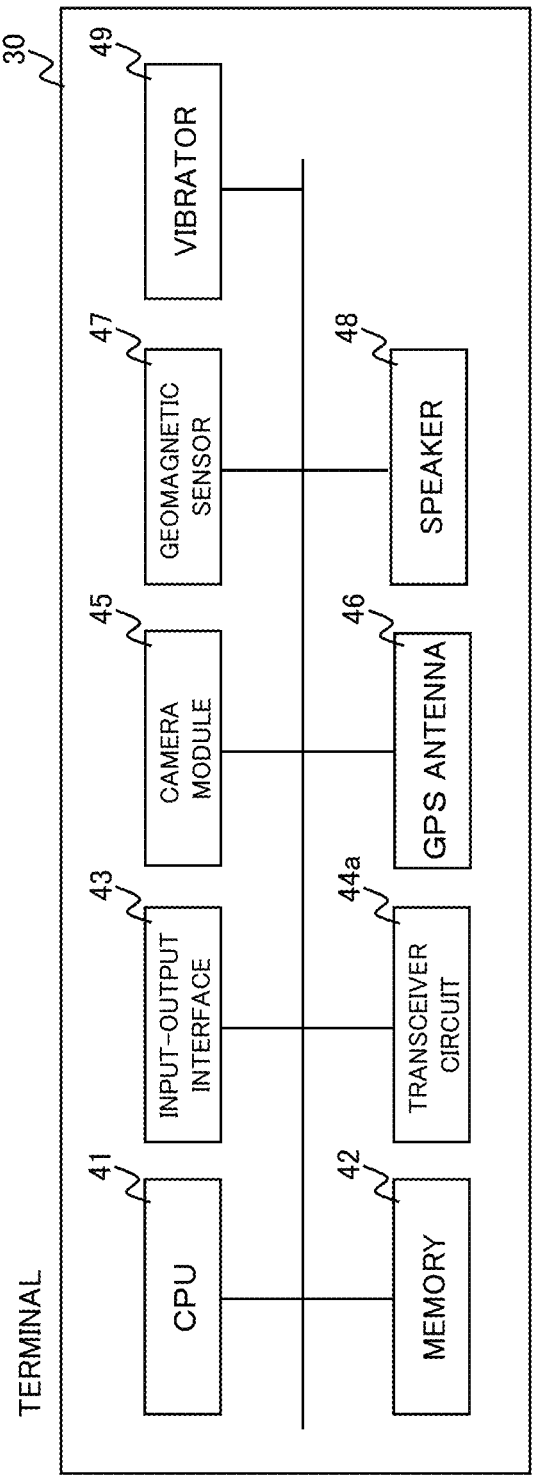
FIG. 4 is a block diagram illustrating an example of a hardware configuration of an individual terminal according to the first exemplary embodiment.

FIG. 4 is a block diagram illustrating an example of a hardware configuration of an individual terminal 30 according to the first exemplary embodiment. As illustrated in FIG. 4, the terminal 30 includes a camera module 45, a GPS (Global Positioning System) antenna 46, a geomagnetic sensor 47, a speaker 48, and a vibrator 49, in addition to the above CPU, etc. The terminal 30 also includes a transceiver circuit 44a that transmits and receives radio signals.

The camera module 45 includes an image sensor such as a lens or a CCD (Charge Coupled Device).

The GPS antenna 46 is used for measuring the location of the terminal 30 and receives GPS signals.

The geomagnetic sensor 47 is a sensor for detecting the direction in which the terminal 30 is oriented. The terminal 30 may include an angular velocity sensor in place of the geomagnetic sensor 47. Namely, any sensor that can detect the direction of the terminal 30 may be used.

The speaker 48 is a device for outputting a sound from the terminal 30, and the vibrator 49 is a device for vibrating the terminal 30.

Since the hardware configurations of the fixed cameras 10 and the mobile cameras 20 are apparent to those skilled in the art, description thereof will be omitted. As to the mobile cameras 20, to calculate the above on-camera areas, the directions in which the mobile cameras 20 are oriented need to be determined. Thus, an individual one of the mobile cameras 20 includes a sensor for detecting the direction of the mobile camera 20, such as a geomagnetic sensor or an angular velocity sensor.

[Processing Modules]

Next, the processing modules of the apparatuses that formulate the video collection system according to the first exemplary embodiment will be described.

[Video Collection Server]

Figure 5:
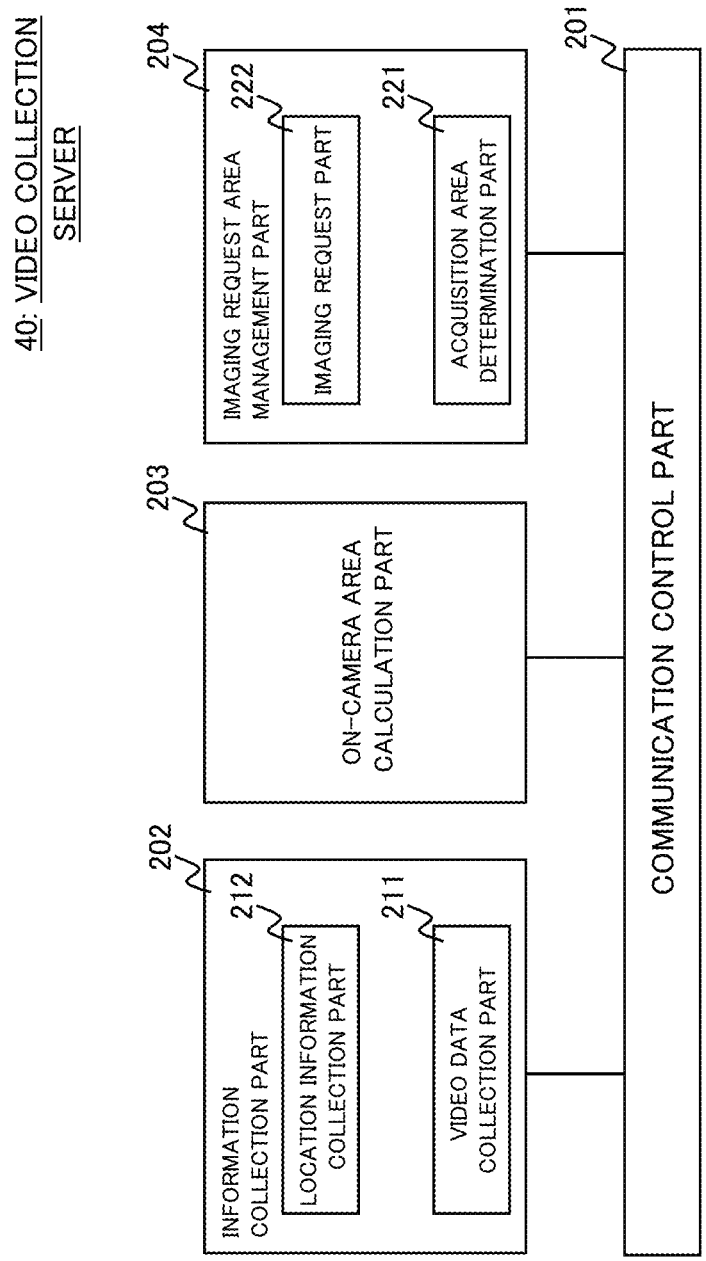
FIG. 5 illustrates an example of a processing configuration of the video collection server according to the first exemplary embodiment.

FIG. 5 illustrates an example of a processing configuration of the video collection server 40 according to the first exemplary embodiment. As illustrated in FIG. 5, the video collection server 40 includes a communication control part 201, an information collection part 202, an on-camera area calculation part 203, and an imaging request area management part 204.

The communication control part 201 controls communication with other apparatuses (the cameras and the terminals 30). In addition, the communication control part 201 sorts data (packets) acquired from the outside into appropriate processing modules. For example, when the communication control part 201 acquires video data from the fixed cameras 10 and the mobile cameras 20, the communication control part 201 gives the video data to the information collection part 202. In addition, the communication control part 201 transmits data acquired from the processing modules to other apparatuses.

The information collection part 202 collects information acquired from various apparatuses in the video collection system and stores the acquired information in a storage medium. The information collection part 202 includes two submodules, which are a video data collection part 211 and a location information collection part 212.

The video data collection part 211 acquires video data from the fixed cameras 10 and the mobile cameras 20 and stores the acquired video data in a storage medium such as an HDD (a Hard Disk Drive). In this operation, the video data collection part 211 sorts the acquired video data by camera and stores the sorted video data in a storage medium.

When a mobile camera 20 transmits video data to the video collection server 40, the mobile camera 20 also transmits information about its own location and direction at the time of the acquisition of the video to the video collection server 40. The video data collection part 211 also stores the information about the location and direction in the storage medium. For example, the video data collection part 211 manages the video data stored in the storage medium by using table information as illustrated in FIG. 6.

While FIG. 6 illustrates the installation locations and the directions of the fixed cameras 10, these items of information can be determined in advance, the fixed cameras 10 may not transmit these items of information. Thus, as illustrated in FIG. 6, the information about the locations and the directions of the fixed cameras 10 may be stored in advance in the table information or may be managed in another table or the like.

The location information collection part 212 collects location information about the terminals 30. The collected location information about the terminals 30 is sorted by terminal and stored in the storage medium (see FIG. 7).

Based on the information acquired from the fixed cameras 10 and the mobile cameras 20, the on-camera area calculation part 203 calculates areas (on-camera areas) imaged by these cameras.

Specifically, when the video data collection part 211 stores the video data in the storage medium, the on-camera area calculation part 203 acquires the latest video data from the storage medium. Alternatively, the on-camera area calculation part 203 may acquire the latest video data by regularly accessing the storage medium in which the video data is stored.

Next, the on-camera area calculation part 203 calculates the on-camera areas by reflecting the imaging ranges of the cameras on a map that represents the monitoring target area. As described above, regarding the fixed cameras 10, since the imaging ranges can be determined in advance, the on-camera area calculation part 203 determines the predetermined ranges as the on-camera areas.

Since the performances (specifications) of the mobile cameras 20 can be determined in advance, the on-camera area calculation part 203 can calculate the sizes of the imaging ranges of the mobile cameras 20. However, since the mobile cameras 20 move, the on-camera area calculation part 203 cannot determine the locations and the directions of the imaging ranges of the mobile cameras 20 in advance. Thus, to calculate the imaging ranges of the mobile cameras 20, the on-camera area calculation part 203 uses the information stored in the storage medium by the video data collection part 211.

The on-camera area calculation part 203 calculates the on-camera areas by using the latest video data of the mobile cameras stored in the storage medium and the information about the locations of the directions of the mobile cameras 20. For example, in the example in FIG. 2, the areas in light gray are calculated as the on-camera areas. By outputting the calculated on-camera areas on a monitor(s) or the like in the operation center, the on-camera area calculation part 203 provides the information to the operator.

The imaging request area management part 204 manages and controls the above imaging request area. The imaging request area management part 204 includes two submodules, which are an acquisition area determination part 221 and an imaging request part 222.

The acquisition area determination part 221 determines the imaging request area, based on at least one of the location of the imaging request area and an operation from an operator. In the first exemplary embodiment, a case in which the imaging request area is determined based on an operation from an operator will be described.

The acquisition area determination part 221 receives an operation from an operator and determines the area (the imaging request area) that a terminal(s) 30 is requested to image in the monitoring target area. For example, the acquisition area determination part 221 determines an area specified by an operation from an operator (for example, an operation of enclosing a certain area on a monitor with a mouse) as the imaging request area. For example, in the example in FIG. 2, the area in dark gray is entered as the imaging request area.

Based on the locations of the plurality of terminals 30 and the location of the imaging request area, the imaging request part 222 selects a terminal(s) 30 to be requested to perform information provision from the plurality of terminals 30 and requests the selected terminal(s) 30 to provide video data of the imaging request area. Specifically, when the imaging request area is determined, the imaging request part 222 selects a terminal(s) 30 to request imaging of the area. The imaging request part 222 refers to the location information of the terminals 30 that has been collected by the location information collection part 212 and extracts a terminal(s) 30 included in or close to the imaging request area.

Next, the imaging request part 222 transmits a message (which will be referred to as an imaging request message) that requests imaging of the imaging request area (information acquisition) to the extracted terminal(s) 30. Namely, the imaging request part 222 requests the extracted terminal(s) 30 to acquire information about the imaging request area (transmits an information acquisition request). For example, in the example in FIG. 2, since the terminal 30-1 is in (or near) the imaging request area, the imaging request part 222 requests the terminal 30-1 to image (provide the video data of) the imaging request area.

If a plurality of terminals 30 are in or near the imaging request area, the imaging request part 222 may transmit an imaging request message to all or some of these terminals 30.

The imaging request area is moved or canceled over time. For example, when a security guard comes close to the imaging request area and starts to image the area, the need for the terminal(s) 30 to continue to image the imaging request area decreases. Thus, there are cases in which the operator cancels the request for the imaging of the imaging request area or requests the terminal(s) 30 to image a different area, depending on, for example, the situation of the site provided by the video collection server 40. Namely, there are cases in which the operator cancels or moves the imaging request area via the acquisition area determination part 221. In these cases, when the video data from the terminal(s) 30 becomes unnecessary, e.g., when the imaging request area is canceled, the imaging request part 222 transmits a message (which will be referred to as an imaging termination message) that requests termination of the imaging (stop of the information acquisition) to the terminal(s) 30 to which the imaging request part 222 has previously transmitted the imaging request message. Namely, when the video data from the terminal(s) 30 is determined to be unnecessary, the imaging request part 222 requests the terminal(s) to stop the information acquisition (notifies the terminal(s) of a request for stopping the information acquisition).

Figure 8:
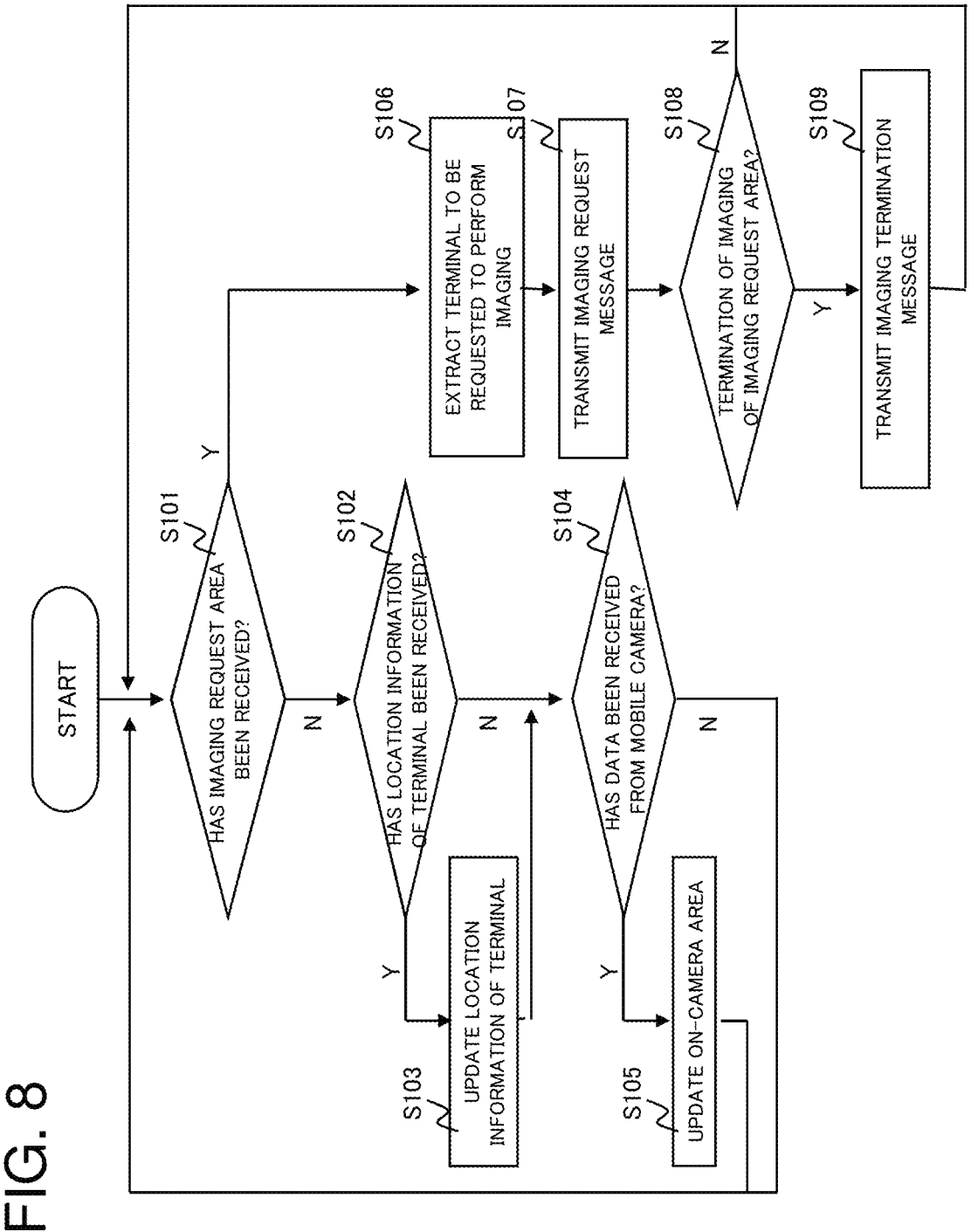
FIG. 8 is a flowchart illustrating an example of an operation of the video collection server according to the first exemplary embodiment.

An outline of an operation of the video collection server 40 will be described by using, for example, a flowchart in FIG. 8.

In step S101, the video collection server 40 determines whether an imaging request area has been entered by an operator. If an imaging request area has been entered (Yes in step S101), the processing proceeds to step S106.

If an imaging request area has not been entered (No in step S101), the video collection server 40 determines whether the video collection server 40 has acquired location information from a terminal (step S102). If the video collection server 40 has acquired location information (Yes in step S102), the video collection server 40 updates the location information of the terminal 30 stored in the storage medium (step S103).

If the video collection server 40 has not acquired any location information (No in step S102), the video collection server 40 determines whether the video collection server 40 has acquired video data from a mobile camera 20 (step S104). If the video collection server 40 has acquired video data (Yes in step S104), the video collection server 40 updates the on-camera area (step S105). The updated on-camera area is provided to the operator. While the video collection server 40 determines whether the video collection server 40 has acquired video data from a mobile camera 20 in step S104, this step includes determining whether the video collection server 40 has acquired video data from a newly installed fixed camera 10.

If the video collection server 40 has not acquired any video data (No in step S104), the processing returns to step S101.

If an imaging request area has been entered by the operator, the video collection server 40 selects (extracts) a terminal(s) 30 that images the imaging request area (step S106). Specifically, the video collection server 40 determines a terminal(s) 30 that responds to the request, based on a relationship between the location of the imaging request area and the locations of the terminals 30.

After the video collection server 40 selects the terminal(s) 30, the video collection server 40 transmits an "imaging request message" to the terminal(s) 30 (step S107).

In step S108, the video collection server 40 determines whether to terminate the imaging of the imaging request area. Specifically, for example, when the video collection server 40 receives an instruction to stop the imaging of the imaging request area from the operator or receives another imaging request area, the video collection server 40 determines to terminate the imaging of the imaging request area.

If the video collection server 40 determines to terminate the imaging of the imaging request area (Yes in step S108), the video collection server 40 transmits an "imaging termination message" to the terminal(s) 30 to which the video collection server 40 has previously transmitted the "imaging request message" (step S109). If the imaging request area has been updated and if a terminal(s) 30 to which the video collection server 40 has previously transmitted the "imaging request message" is included in or is close to a new imaging request area, the video collection server 40 may not transmit the "imaging termination message" to the terminal(s) 30.

If the video collection server 40 determines not to terminate the imaging of the imaging request area (No in step S108), the processing returns to step S101.

[Terminal]

Figure 9:
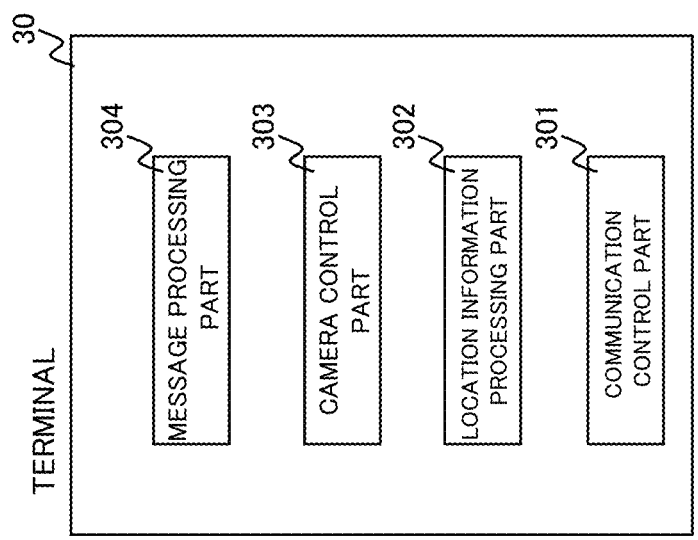
FIG. 9 illustrates an example of a processing configuration of an individual terminal according to the first exemplary embodiment.

FIG. 9 illustrates an example of a processing configuration of an individual terminal 30 according to the first exemplary embodiment. As illustrated in FIG. 9, the terminal 30 includes a communication control part 301, a location information processing part 302, a camera control part 303, and a message processing part 304.

The communication control part 301 controls communication with another apparatus (the video collection server 40), as in the communication control part 201 in the video collection server 40.

The location information processing part 302 calculates the location information of its own apparatus and regularly transmits the detected location information to the video collection server 40. For example, based on the GPS signal acquired via the GPS antenna 46, the location information processing part 302 obtains the coordinates (the latitude and the longitude) of its own apparatus and calculates the location information of its own apparatus. The location information processing part 302 regularly outputs the calculated location information to the video collection server 40.

The camera control part 303 controls the camera module 45 of its own apparatus and acquires video data. The camera control part 303 stores the acquired video data, etc. in a storage medium.

The message processing part 304 processes messages (an imaging request message, an imaging termination message, etc.) acquired from the video collection server 40. Specifically, when the terminal 30 receives an "imaging request message", the message processing part 304 displays information (which will be referred to as an imaging request screen) requesting the user (owner) to image the imaging request area on a monitor of its own apparatus. Namely, the terminal 30 generates an imaging request screen requesting the user to image the imaging request area, based on a request from the video collection server 40.

When the user enters a video data acquisition instruction to the terminal 30, the message processing part 304 instructs the camera control part 303 to acquire video data. Since the video data acquired by the camera is stored in a storage medium, the message processing part 304 reads the stored video data and transmits the read video data to the video collection server 40.

In addition, when the terminal 30 receives an imaging termination message from the video collection server 40, the message processing part 304 instructs the camera control part 303 to terminate the imaging. As is the case with the reception of the "imaging request message", information requesting the user to terminate the imaging may be displayed on the monitor of its own apparatus. In this case, when the user enters a video data acquisition termination instruction to the terminal 30, the message processing part 304 instructs the camera control part 303 to terminate the imaging.

As described above, the present exemplary embodiment assumes that the individual terminal 30 is a terminal owned by a volunteer at a sports event or the like. A terminal of a person previously registered as a volunteer can be used as a terminal 30 by installing an application corresponding to the processing modules such as the above message processing part 304 in the terminal.

Figure 10:
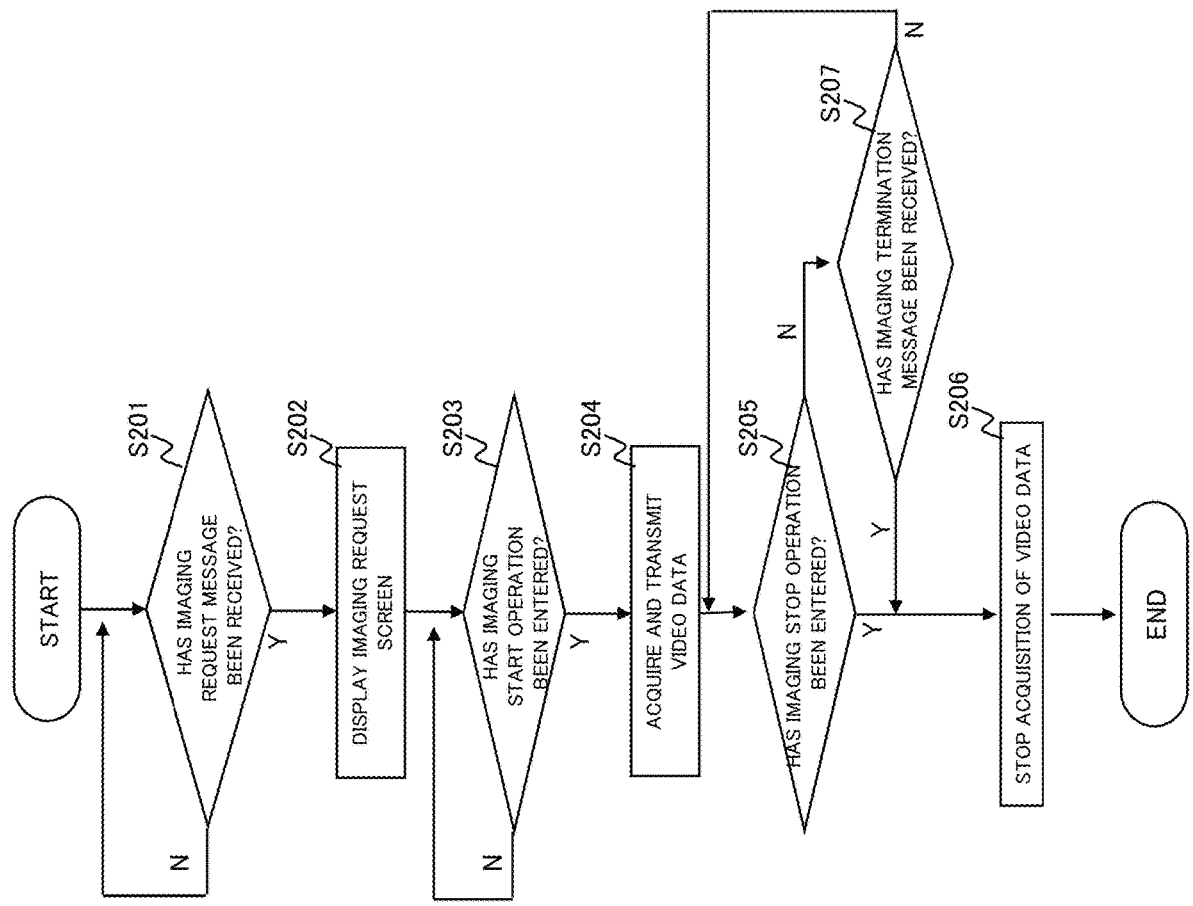
FIG. 10 is a flowchart illustrating an example of an operation of an individual terminal according to the first exemplary embodiment.

An outline of an operation of an individual terminal 30 will be described by using, for example, a flowchart illustrated in FIG. 10.

In step S201, the terminal 30 determines whether the terminal 30 has received an imaging request message. If the terminal 30 has not received the message (No in step S201), the terminal 30 stands by until the terminal 30 has received an imaging request message.

If the terminal 30 has received an imaging request message (Yes in step S201), the terminal 30 displays an imaging request screen (step S202).

In step S203, the terminal 30 determines whether the user has entered an imaging start operation on the imaging request screen. If the user has not entered an imaging start operation (No in step S203), the terminal 30 stands by until this operation is entered.

If the user has entered an imaging start operation (Yes in step S203), the terminal 30 acquires video data from its camera and transmits the video data to the video collection server 40 (step S204).

In step S205, the terminal 30 determines whether the user has entered an imaging stop operation (for example, an operation of turning off the power of the terminal 30). If the user has entered this operation (Yes in step S205), the terminal 30 stops the acquisition and transmission of the video data (step S206).

If the user has not entered an imaging stop operation (No in step S205), the terminal 30 determines whether the terminal 30 has received an imaging termination message (step S207). If the terminal 30 has not received this message (No in step S207), the processing returns to the determination processing in step S205. If the terminal 30 has received the imaging termination message (Yes in step S207), the terminal 30 stops the acquisition and transmission of the video data (step S206).

[System Operation]

Figure 11:
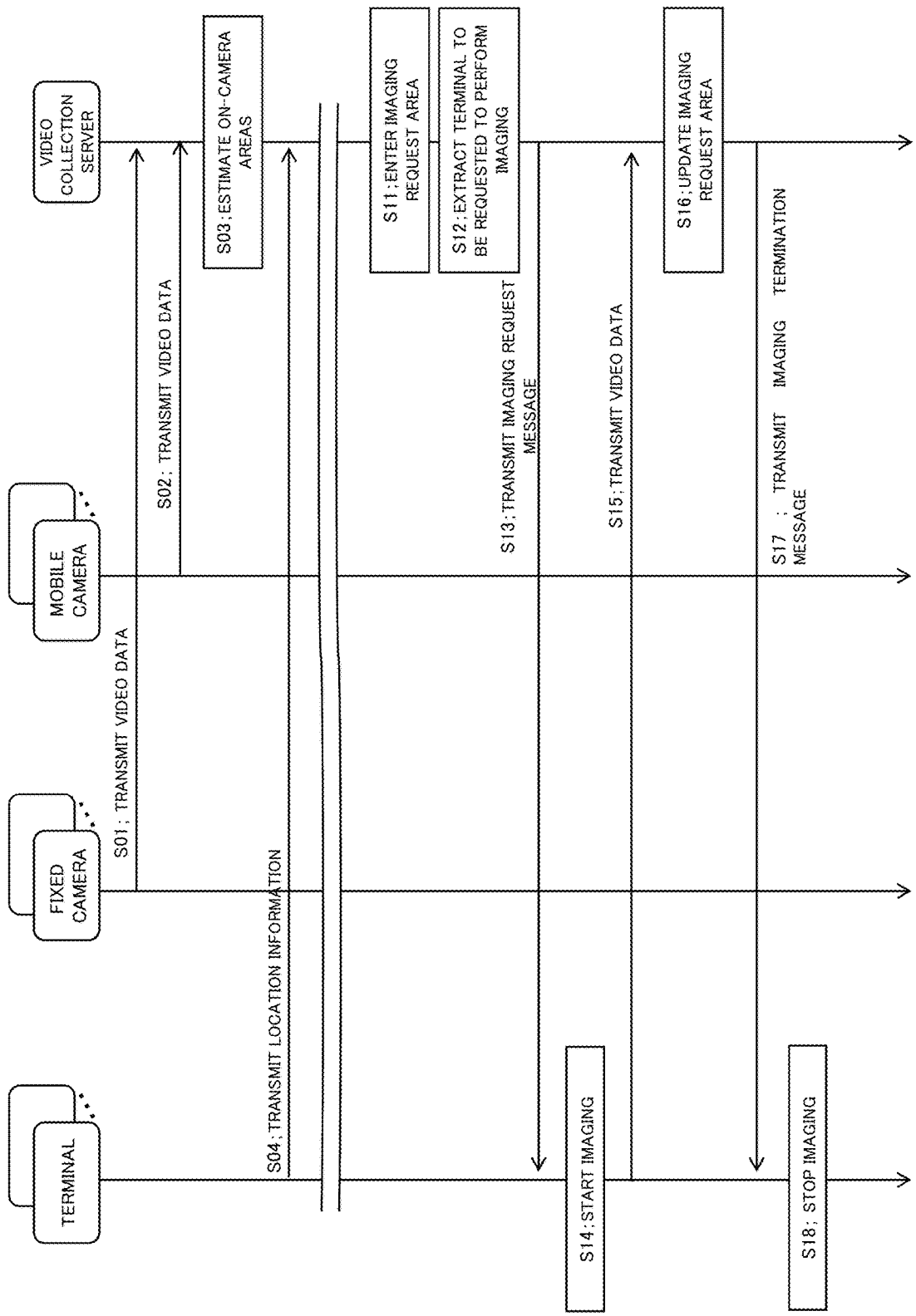
FIG. 11 is a sequence diagram illustrating an example of an operation of the video collection system according to the first exemplary embodiment.

Next, an operation of the video collection system according to the first exemplary embodiment will be described with reference to FIG. 11.

The fixed cameras 10 and the mobile cameras 20 regularly or continuously transmit video data to the video collection server 40 (steps S01 and S02). The video data acquired by the video collection server 40 is displayed on a monitor(s) at an operation center, etc. (see FIG. 12(a)).

When the video collection server 40 acquires the video data from the mobile cameras 20, the video collection server 40 calculates (estimates) the on-camera areas (step S03). The estimated on-camera areas are displayed on a monitor(s) at the operation center, etc. as in the case with the videos from the cameras (see FIG. 12(b)).

The terminals 30 regularly transmit location information of their own apparatuses to the video collection server 40 (step S04).

The processing in the above steps S01 to S04 is repeated while the system is operating.

The operator checks the camera images (FIG. 12(a)) and the on-camera areas (FIG. 12(b)) and enters an imaging request area (step S11). For example, when the operator determines that a large area is not imaged in the monitoring target area, the operator enters this area not being imaged as the imaging request area to the video collection server 40. Alternatively, when the operator checks the videos of the cameras and recognizes presence of a suspicious person(s), the operator sets the area around the suspicious person(s) as the imaging request area(s) and enters the imaging request area(s) to the video collection server 40. In this case, the on-camera area(s) and the imaging request area(s) could overlap entirely or partially.

For example, as illustrated in FIG. 12(b), the operator enters the area that he/she wishes to check by using a device such as a mouse. When the operator enters an imaging request area, the video collection server 40 selects (extracts) a terminal(s) 30 requested to perform imaging, based on the location of the imaging request area and the previously collected location information of the terminals 30 (step S12). For example, the video collection server 40 selects a terminal(s) 30 in the imaging request area or a terminal 30 closest to the imaging request area.

Figure 13:
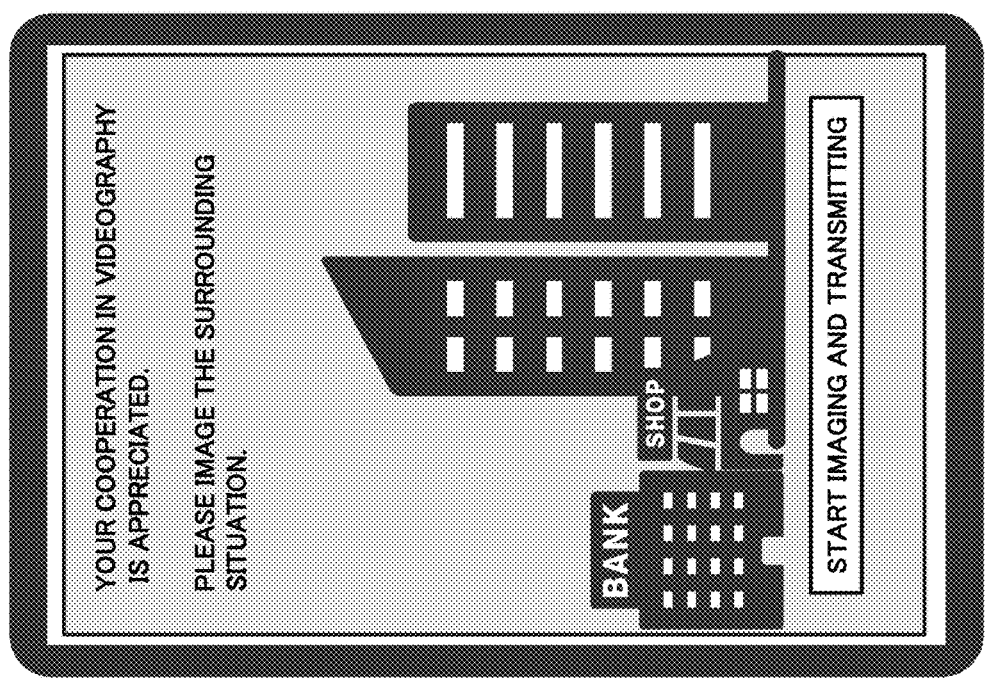
FIG. 13 illustrates an operation of the video collection system according to the first exemplary embodiment.

Next, the video collection server 40 transmits an imaging request message to the selected terminal(s) 30 (step S13). The terminal(s) 30 that has received the message displays an imaging request screen. For example, the terminal(s) 30 displays a screen (a GUI; a Graphical User Interface) as illustrated in FIG. 13. FIG. 13 illustrates an example in which a message notifying the user of a request for starting imaging and an icon (a button) for stating the imaging and transmission are displayed on the data (background) acquired from the camera.

When a terminal receives a user operation, e.g., when the user presses a "start imaging and transmitting" button in FIG. 13, the terminal 30 starts imaging (step S14).

The acquired video data is transmitted to the video collection server 40 (step S15). The video collection server 40 outputs the acquired video data to a monitor(s) or the like at the operation center. For example, the video collection server 40 may display the video data on a monitor specially installed for the imaging request area or the video data of the imaging request area as a part on the screen in FIG. 12(a). Alternatively, as illustrated in FIG. 12(c), the video data may be superimposed on the imaging request area entered by the operator.

Next, the operator updates the imaging request area by performing an operation of terminating the imaging of the imaging request area or an operation of requesting imaging of a different imaging request area (step S16).

If the video data from a terminal 30 imaging the imaging request area becomes unnecessary, the video collection server 40 transmits an imaging termination message to this terminal 30 (step S17). When the terminal 30 receives this imaging termination message, the terminal 30 stops the imaging of the imaging request area (step S18).

As described above, in the video collection system according to the first exemplary embodiment, a terminal(s) 30 of a volunteer(s), etc. who is(are) present in a monitoring target area is requested to image the area whose situation needs to be understood. As a result, the detailed situation of an area in which a video cannot be acquired by any of the fixed cameras 10 and the mobile cameras 20 for security purposes can be accurately obtained.

Second Exemplary Embodiment

Next, a second exemplary embodiment will be described in detail with reference to drawings.

The acquisition area determination part 221 according to the first exemplary embodiment determines an imaging request area based on an operation from an operator. According to the second exemplary embodiment, a case in which an imaging request area is determined automatically by the video collection server 40 will be described. Since the configurations of the system and various components according to the second exemplary embodiment are the same as those according to the first exemplary embodiment, descriptions corresponding to FIGS. 2, 5, etc. will be omitted.

The acquisition area determination part according to the second exemplary embodiment 221 automatically determines an imaging request area based on the video data acquired from the cameras (the fixed cameras 10 and the mobile cameras 20) and the calculated on-camera areas, even besides an operation from an operator.

The acquisition area determination part 221 may determine an imaging request area by analyzing the video data acquired from the individual cameras. The video data to be analyzed by the acquisition area determination part 221 includes not only the video data acquired by the fixed cameras 10 and the mobile cameras 20 but also the video data acquired by a terminal(s) 30 imaging the imaging request area.

For example, the background captured by a camera could greatly change due to an accident, a terrorist attack, or the like. The acquisition area determination part 221 can detect this change by analyzing the video data and sets this area as the imaging request area. More specifically, the acquisition area determination part 221 analyzes video data acquired from a certain camera(s) and calculates the difference between the previous video data (image data) and the current video data. When the calculated difference is larger than a predetermined threshold, the acquisition area determination part 221 determines that some accident or the like has occurred and determines the area(s) around the camera providing the video data as the imaging request area.

The acquisition area determination part 221 may detect an event that has occurred in the monitoring target area (namely, the entire monitoring target area including the on-camera areas and an imaging request area) based on the results obtained by analyzing the video data acquired from the cameras (the fixed cameras 10 and the mobile cameras 20) and the terminal(s) 30 requested to image the imaging request area and determine the range of the imaging request area based on the kind of the detected event. Namely, the acquisition area determination part 221 may determine a range within a certain distance from the location of the occurrence of the event as the imaging request area, based on the kind of the event that has occurred (a crime such as a terrorist attack or an accident such as a fire).

When the transmission of the video data from a camera is interrupted, the acquisition area determination part 221 may determine the area including this camera as the imaging request area. This is because interruption of the video data from a camera could indicate occurrence of some abnormal situation around the camera.

When the acquisition area determination part 221 analyzes video data and detects a suspicious object(s) or person(s), the acquisition area determination part 221 may determine an area including the suspicious object(s) or the like as the imaging request area. For example, the acquisition area determination part 221 extracts predetermined target objects such as bags from the video data acquired by the cameras by using a technique such as pattern matching. When a target object is detected, the acquisition area determination part 221 monitors the target object until the target object is moved. When the target object is left unattended for a predetermined time or more, the acquisition area determination part 221 determines an area including the target object as the imaging request area.

The acquisition area determination part 221 may extract a suspicious person(s) by applying an existing suspicious person detection technique to the video data. An area including the extracted suspicious person is determined as the imaging request area.

Figure 14:
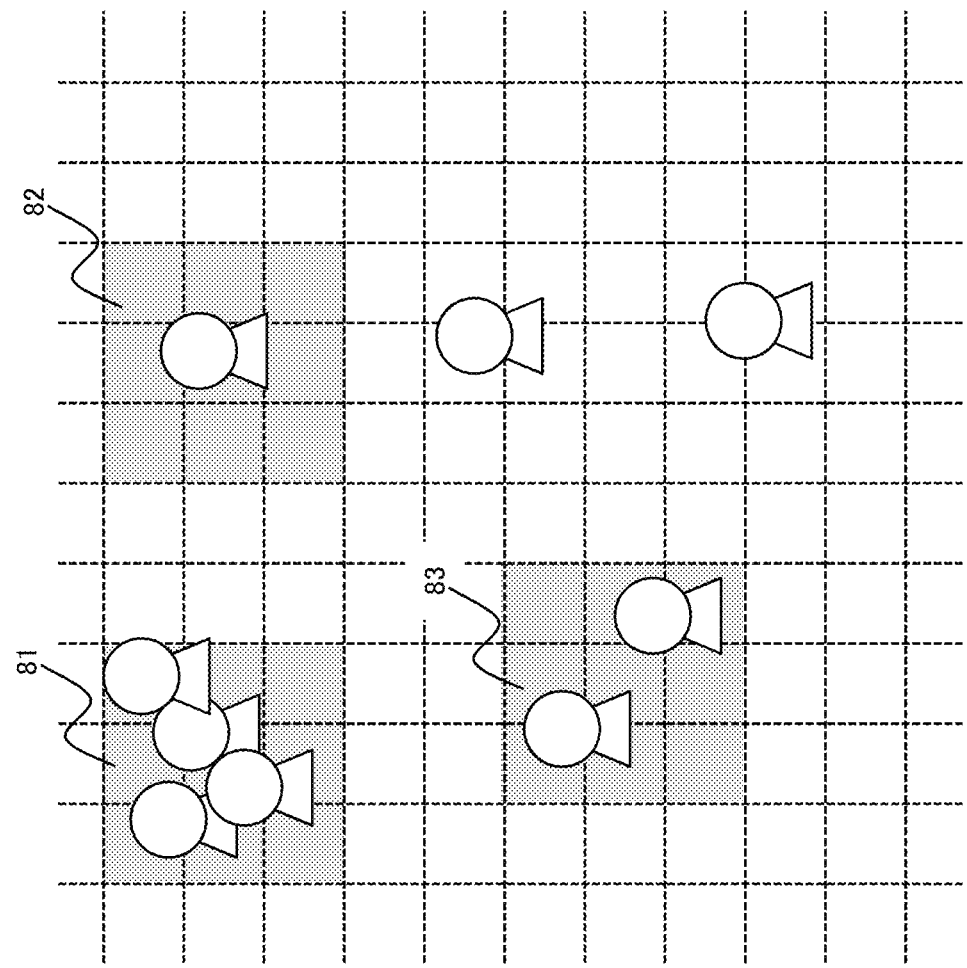
FIG. 14 illustrates an operation of an acquisition area determination part according to a second exemplary embodiment.

The acquisition area determination part 221 may determine an imaging request area by analyzing the video data and calculating the population density (how many people are crowded) in a predetermined unit. For example, the acquisition area determination part 221 may calculate the above density by dividing the monitoring target area into a plurality of areas and determining the number of people in each of these areas. For example, as illustrated in FIG. 14, while an area 81 is crowded, other areas (areas in which the number of people can be analyzed from the video data) 82 and 83 are not crowded. In this case, the acquisition area determination part 221 determines the area 81 as the imaging request area. This determination of the imaging request area by using the population density is based on the notion that a crime, trouble, etc. tend to occur at a place where many people gather.

Figure 15:
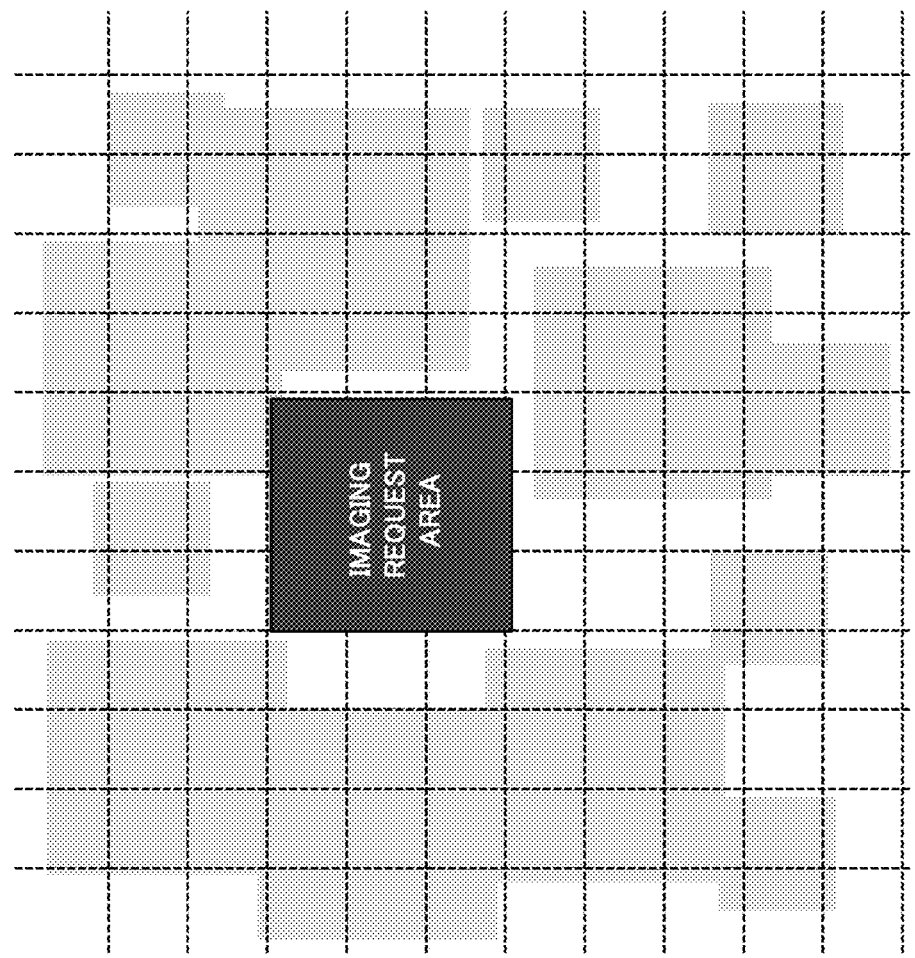
FIG. 15 illustrates an operation of the acquisition area determination part according to the second exemplary embodiment.

The acquisition area determination part 221 may determine the imaging request area based on the on-camera areas calculated by the on-camera area calculation part 203. Specifically, the acquisition area determination part 221 may determine an area of a predetermine size or more among the areas not being imaged by the cameras (among the areas from which video data is not being acquired) in the monitoring target area as the imaging request area. The following example assumes that the areas in light gray illustrated in FIG. 15 have been calculated as the on-camera areas and that an area size corresponding to nine squares has been set as the above predetermined area size. In this case, for example, the acquisition area determination part 221 determines the area around the middle in FIG. 15 as the imaging request area.

If the location of a terminal 30 that has contacted the police or fire department can be acquired, the acquisition area determination part 221 may determine an area including the terminal 30 as the imaging request area. Namely, when a carrier and a security system company coordinate with each other and the location information of the terminal 30 that has contacted the police or the like can be acquired, the acquisition area determination part 221 may determine the imaging request area, based on the location of the terminal 30.

As described above, in the video collection system according to the second exemplary embodiment, based on information different from externally entered information (an operation from an operator), an area that could interests the operator is estimated, and a terminal(s) 30 is requested to image the area. As a result, even when a terrorist attack, an accident, or the like occurs, the operator can be notified of the situation promptly.

Third Exemplary Embodiment

Next, a third exemplary embodiment will be described in detail with reference to drawings.

According to the first exemplary embodiment, the video collection server 40 transmits an imaging request message to a terminal(s) 30 that is in (or close to) the imaging request area. In this case, the terminal(s) 30 images the surrounding area and transmits the video data to the video collection server 40. However, there are cases in which information desired by the operator cannot be obtained. For example, in FIG. 2, even when the video collection server 40 transmits an imaging request message to the terminal 30-1, the owner (the person 50) of the terminal 30-1 may not image the area in the top right direction in FIG. 2. The owner may image an area in a different direction, instead.

According to the third exemplary embodiment, a video collection system in which video data desired by an operator is acquired by adding various kinds of information to an imaging request message will be described. Since the configurations of the system and various components according to the third exemplary embodiment are the same as those according to the first exemplary embodiment, descriptions corresponding to FIGS. 2, 5, etc. will be omitted.

The imaging request part 222 according to the third exemplary embodiment may transmit an imaging request message including location information of an imaging request area to a terminal(s) 30. Namely, since the imaging request part 222 notifies a terminal(s) 30 of location information (for example, coordinates of a center point, coordinates of four corners, etc.) of an imaging request area, the terminal(s) 30 can indicates the location of the imaging request area to the user.

The imaging request part 222 may determine the direction in which the terminal(s) 30 acquires video data (which will be referred to as an imaging direction), based on the location (coordinates) of the imaging request area and the location(s) of the terminal(s) 30. For example, in the case of FIG. 2, since the imaging request area is located the northeast direction from the terminal 30-1, the imaging request part 222 may transmit an imaging request message including information indicating "the imaging direction is northeast" (information about the imaging direction determined by the imaging request part 222) to the terminal 30-1.

As described above, the imaging request part 222 may transmit an imaging request message to a plurality of terminals 30. In this case, by changing the information (the imaging direction) to be transmitted per terminal 30, details of the imaging request area can be obtained. More specifically, when the imaging request part 222 selects a plurality of terminals 30 that the imaging request part 222 requests information provision and requests each of the selected terminals 30 to image the imaging request area, the imaging request part 222 gives instructions so that the imaging directions of the selected terminals 30 will not overlap with one another.

Figure 16:
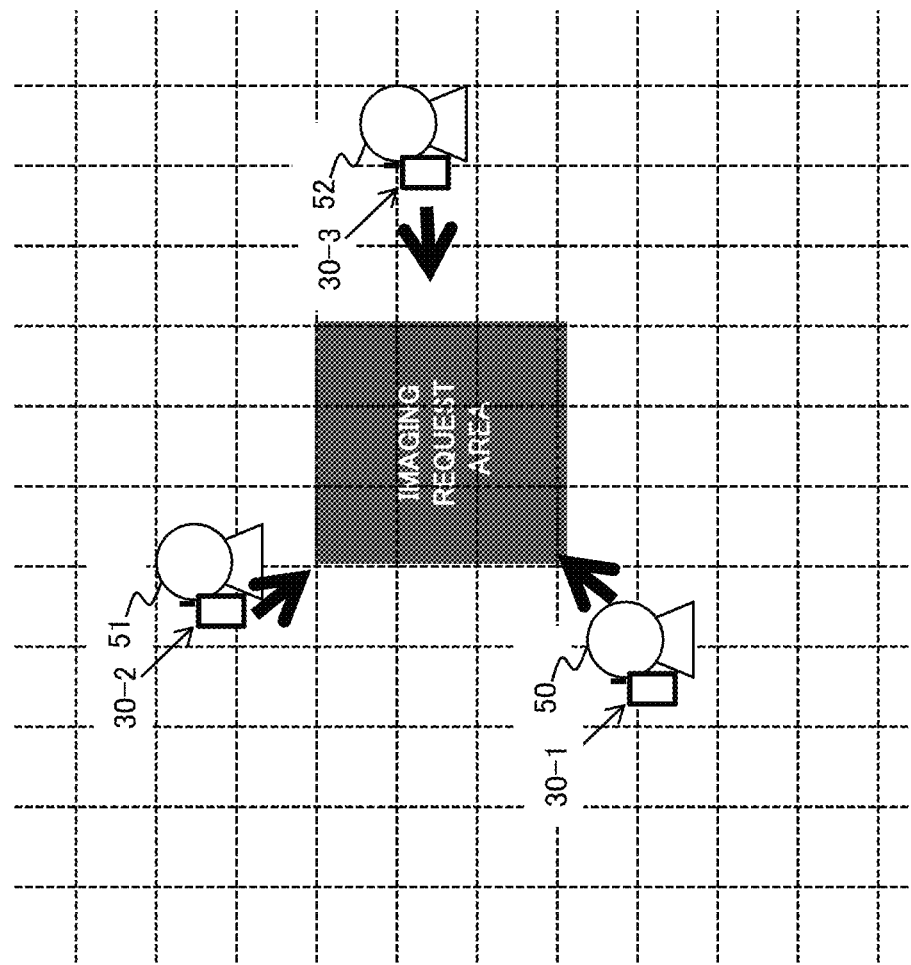
FIG. 16 illustrates an operation of an imaging request part according to a third exemplary embodiment.

For example, a situation illustrated in FIG. 16 will be considered. In FIG. 16, for example, the imaging request part 222 transmits an imaging request message to three terminals 30-1 to 30-3. In this operation, for example, the imaging request part 222 instructs the terminal 30-1 to perform imaging in the northeast direction, the terminal 30-2 to perform imaging in the southeast direction, and terminal 30-3 to perform imaging in the west direction. As a result, every corner of the imaging request area can be imaged, and information desired by the operator can be provided.

Various kinds of information other than the above information can be included in the information transmitted from the imaging request part 222 to a terminal(s) 30.

For example, there are cases in which the operator becomes interested in a target(s) and wishes to know about the target(s) in detail after checking the videos acquired from the cameras. For example, the above suspicious object(s) (baggage left unattended for a long time) or a suspicious person(s) (a person(s) who seems to be showing suspicious behavior) is the target(s) about which the operator wishes to know in detail. In this case, the operator enters information about the target(s) to the video collection server 40.

The imaging request part 222 may transmit an imaging request message including the entered information to a terminal(s) 30. For example, when the operator wishes to know about a "person wearing red clothes" in detail, the operator enters information about this person to the video collection server 40 and transmits an imaging request message including the information. The terminal(s) 30 that has received this message may display a message indicating "please image the person wearing red clothes".

When a building (a landmark) such as a station is the target, the imaging request part 222 may transmit an imaging request message including a name such as a station name to a terminal(s) 30. The terminal(s) 30 that has received this message may display a message indicating "please image the station of "specified name".

When an imaging request area is automatically calculated as described in the second exemplary embodiment, the imaging request part 222 may specify an imaging target(s) by using an image or the like used as the basis for the calculation of the imaging request area and request a terminal(s) 30 to image the imaging target(s). For example, when an area including baggage left unattended for a long time is determined as the imaging target area, the imaging request part 222 may transmit an imaging request message including an image of the baggage to a terminal(s) 30. When a suspicious person(s) is detected and an area around the person(s) is determined as the imaging target area, the imaging request part 222 may transmit an imaging request message including a face image(s) of the suspicious person(s) to a terminal(s) 30. While displaying the image of the baggage or the face image(s) of the suspicious person(s), the terminal(s) 30 displays a message requesting imaging of the baggage or the like.

The imaging request part 222 may transmit information about an event detected by analyzing video data to a terminal(s) 30. For example, the imaging request part 222 may transmit the kind (a crime or an accident) of an event that has occurred to a terminal(s) 30.

As described above, the video collection server 40 according to the third exemplary embodiment transmits information to a terminal(s) 30. Examples of the information include information about the imaging request area, information obtained by analyzing video data (the location of the occurrence of the event and the kind of the event), and information about the imaging target(s) (for example, a photograph(s) of the imaging object(s)). The terminal(s) 30 can create an imaging request screen by using these items of information.

Fourth Exemplary Embodiment

Next, a fourth exemplary embodiment will be described in detail with reference to drawings.

In the fourth exemplary embodiment, a user interface provided by a terminal 30 that has received an imaging request message will be described. Since the configurations of the system and various components according to the fourth exemplary embodiment are the same as those according to the first exemplary embodiment, descriptions corresponding to FIGS. 2, 5, etc. will be omitted.

Basically, when a terminal 30 receives an imaging request message, the terminal 30 displays information as illustrated in FIG. 13. Namely, in a basic mode, the terminal 30 provides the user with a GUI including a message notifying the user of "start of videography is requested" and an icon (a button) of "start imaging and transmitting". In the fourth exemplary embodiment, a GUI added to the above basic mode or a different GUI will be described.

Figure 17:
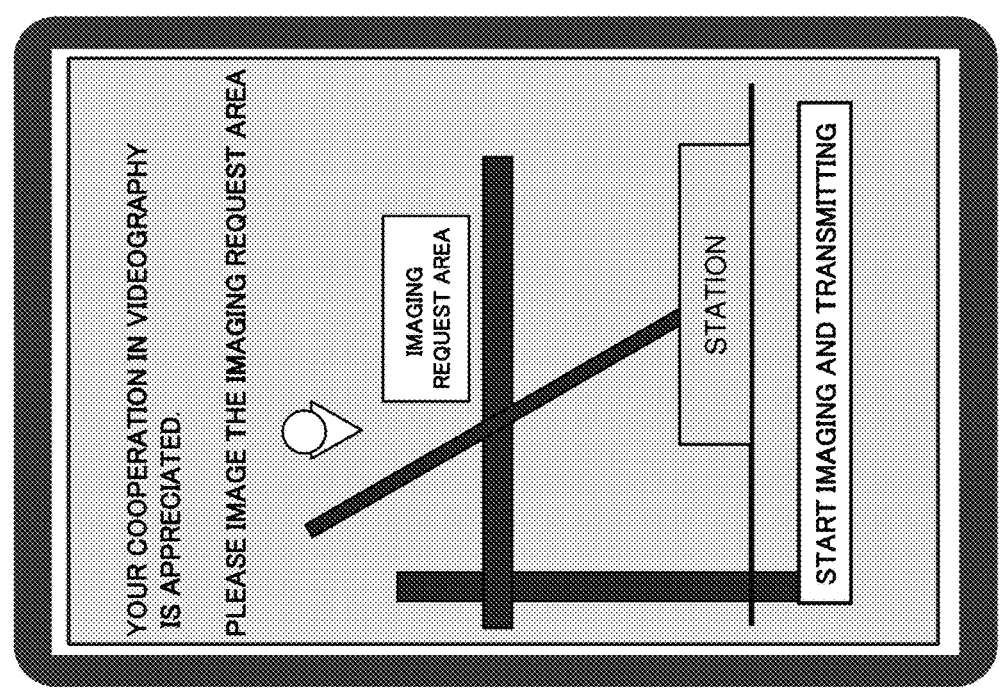
FIG. 17 illustrates an operation of an imaging request part according to a fourth exemplary embodiment.

When the message processing part 304 acquires the location of an imaging request area from the video collection server 40, the message processing part 304 may generate an imaging request screen by using this information. For example, the message processing part 304 may display a map including the imaging request area and the location of its own apparatus (the terminal 30). Specifically, the terminal 30 may display information as illustrated in FIG. 17. After the user touches the GUI illustrated in FIG. 17, the user orients the camera of the terminal 30 toward the imaging request area and presses the button "start imaging and transmitting". Consequently, the terminal 30 transmits video data acquired from the camera to the video collection server 40 while displaying the video data. As described above, the terminal 30 may reflect the location of its own apparatus and the imaging request area on the map, based on the information (by using information) provided by the video collection server 40.

When the terminal 30 receives an imaging request message including information about an imaging direction from the video collection server 40, the message processing part 304 may display the specified direction (see FIG. 18(a)). In FIG. 18(a), while the direction in which the user is requested to perform imaging is displayed, an angle at which the user is requested to perform imaging may be clearly specified. For example, the terminal 30 may display a message notifying the user of "Please image the area at 30 degrees in the top right direction".

When the terminal 30 acquires information about the imaging direction from the video collection server 40, the message processing part 304 may display a map on which the location of its own apparatus and the acquired imaging direction are clearly specified. Specifically, the terminal 30 may display information as illustrated in FIG. 18(b).

Based on the location of its own apparatus and the specified imaging direction, the message processing part 304 may calculate the direction in which the user needs to orient the terminal 30 and display information in which the calculated direction is clearly indicated (see FIG. 19). As descried above, the terminal 30 includes an electronic compass such as a geomagnetic sensor and can recognize the direction in which its own apparatus is oriented. Thus, the terminal 30 can determine the direction to be displayed on the screen from the direction of its own apparatus and the direction specified by the video collection server 40. For example, when the terminal 30 is oriented "north" and the instructed direction is also "north", the terminal 30 (the message processing part 304) can display an arrow requesting the user to orient the terminal 30 in the front direction (see FIG. 19(a)). Alternatively, when the terminal 30 is oriented "north" and the instructed direction is "west", the terminal 30 can display an arrow requesting the user to rotate the terminal 30 to the left by 90 degrees and perform imaging in this direction (see FIG. 19(b)).

When the terminal 30 acquires information about an event that has occurred in the monitoring area (the location of the occurrence of an event or the kind of an event, for example) from the video collection server 40, the message processing part 304 may reflect this information on the imaging request screen (may create the imaging request screen by using this information). Namely, the terminal 30 may display, for example, the location of the event that has occurred on a map. In this case, the location of the occurrence of the event may be circled or clearly specified by an arrow.

When the terminal 30 acquires an image of a person or a building that needs to be imaged from the video collection server 40, the message processing part 304 may display the acquired image in addition to the message, etc. Namely, the message processing part 304 may create an imaging request screen by using imaging target object information (for example, a station name) or a photograph (for example, a photograph of a suspicious person).

To notify the user (the owner) that "an imaging request screen" is displayed on a screen of its own apparatus, the terminal 30 may output an alarm sound by using a speaker or be vibrated by using a vibration function. Namely, the terminal 30 may notify the user of the creation of an imaging request screen by using sound and/or vibration.

As described above, the individual terminals 30 according to the fourth exemplary embodiment can provide a user-friendly interface by generating an imaging request screen based on the content included in the information acquired from the video collection server 40.

Fifth Exemplary Embodiment

Next, a fifth exemplary embodiment will be described in detail with reference to drawings.

In the fifth exemplary embodiment, the video collection server 40 transmits messages other than an imaging request message and an imaging termination message to a terminal(s) 30.

Figure 20:
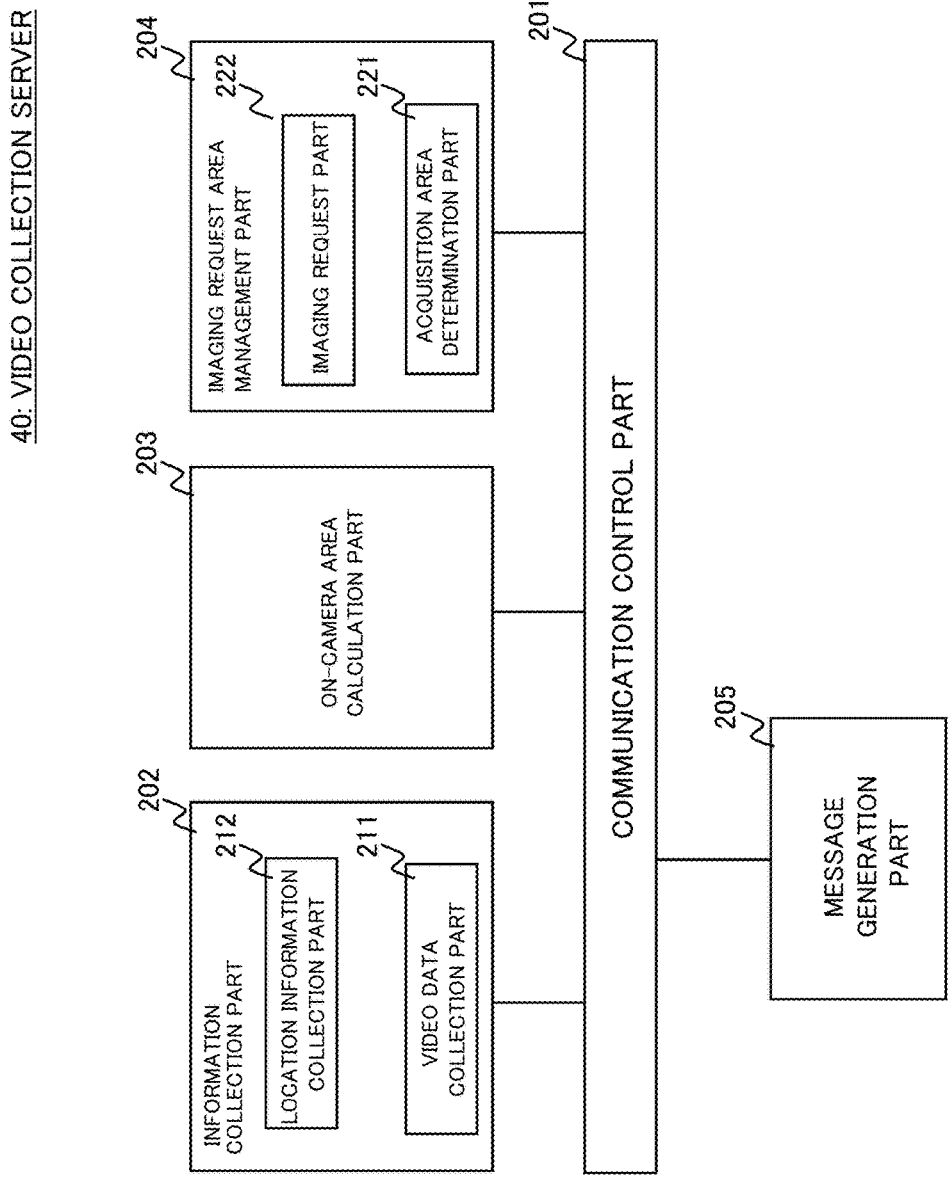
FIG. 20 illustrates an example of a processing configuration of a video collection server according to a fifth exemplary embodiment.
Figure 21:
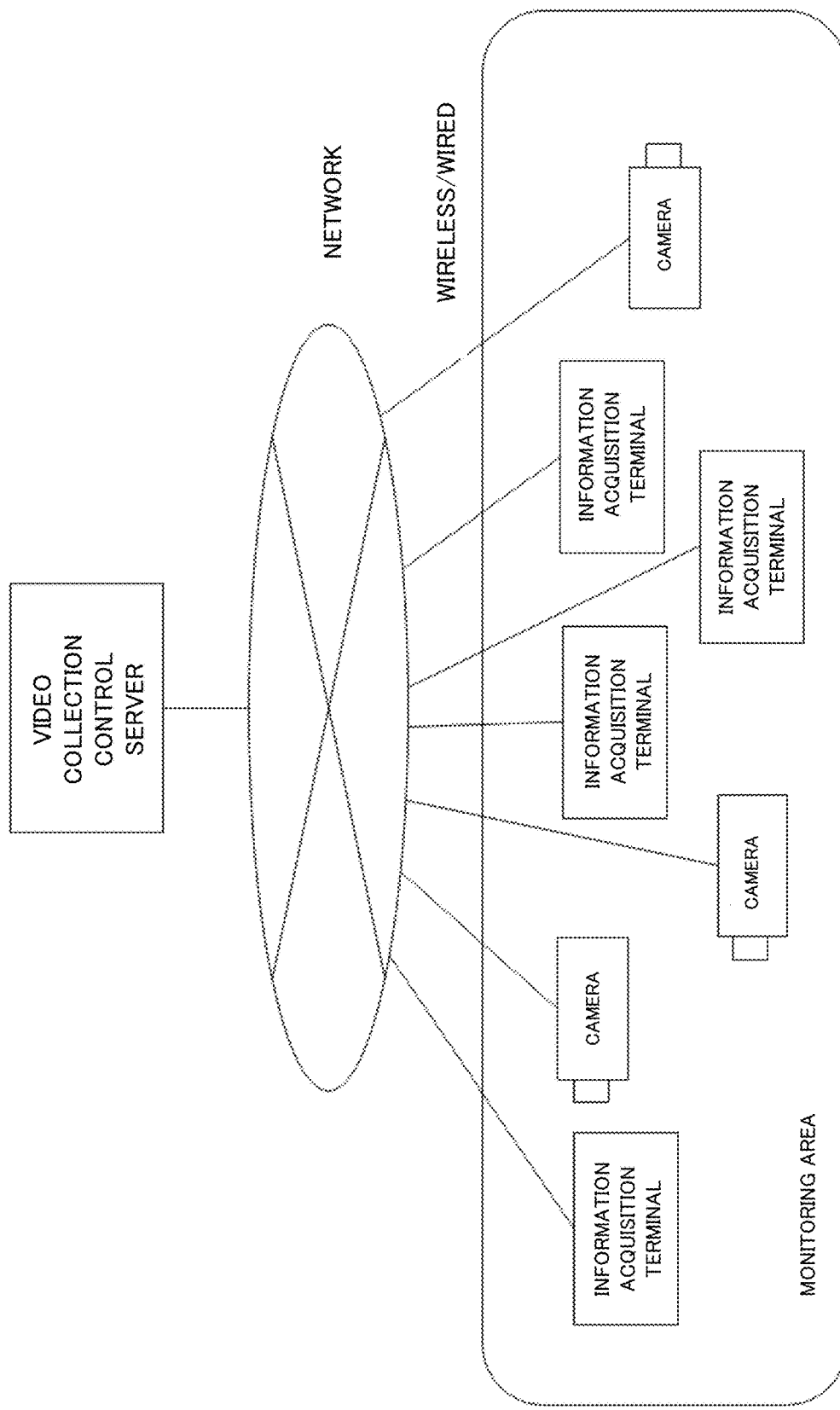
FIG. 21 illustrates an example of a configuration of a system according to an exemplary embodiment.
Figure 22:
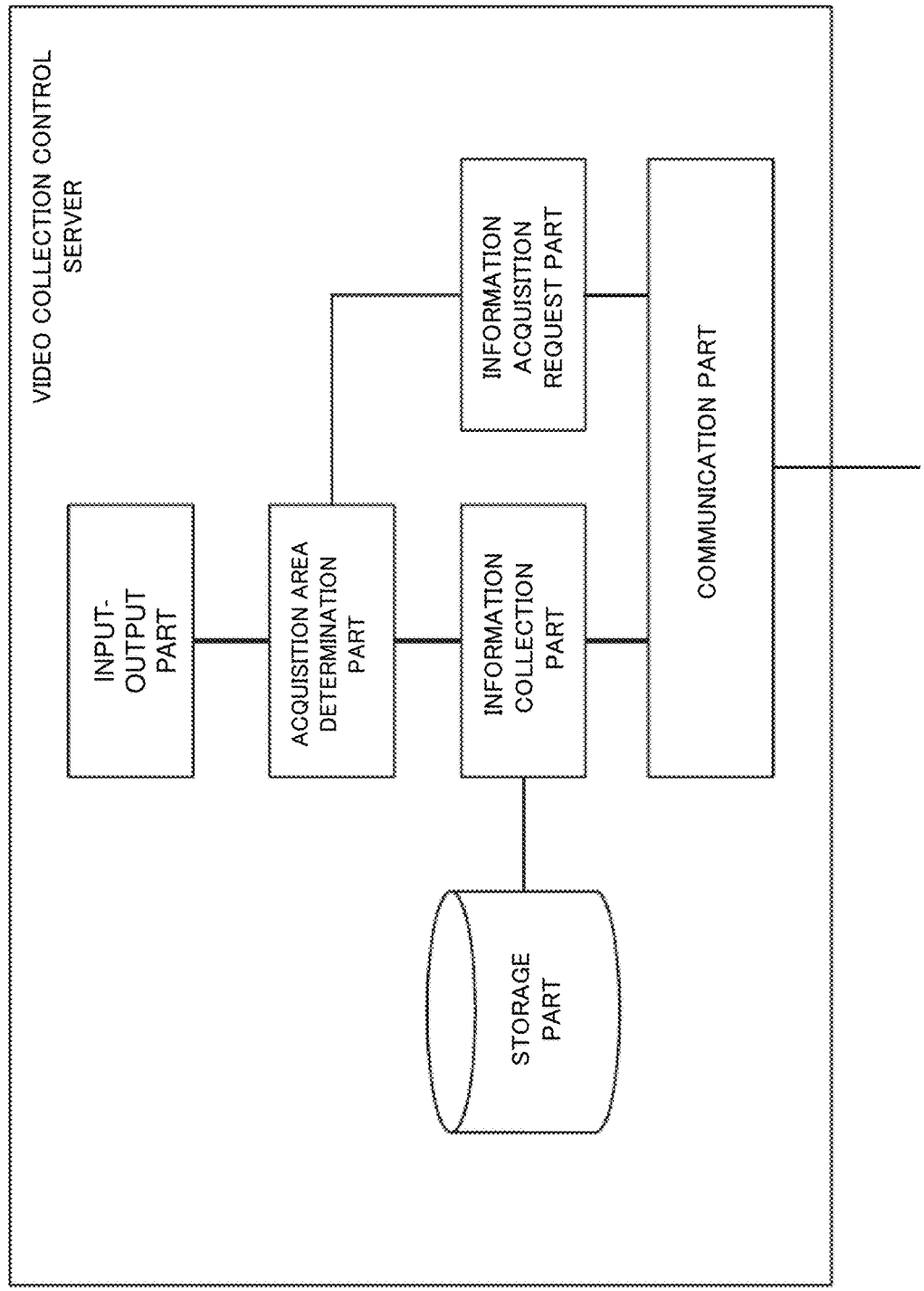
FIG. 22 illustrates an example of a configuration of a video collection control server according to an exemplary embodiment.
Figure 23:
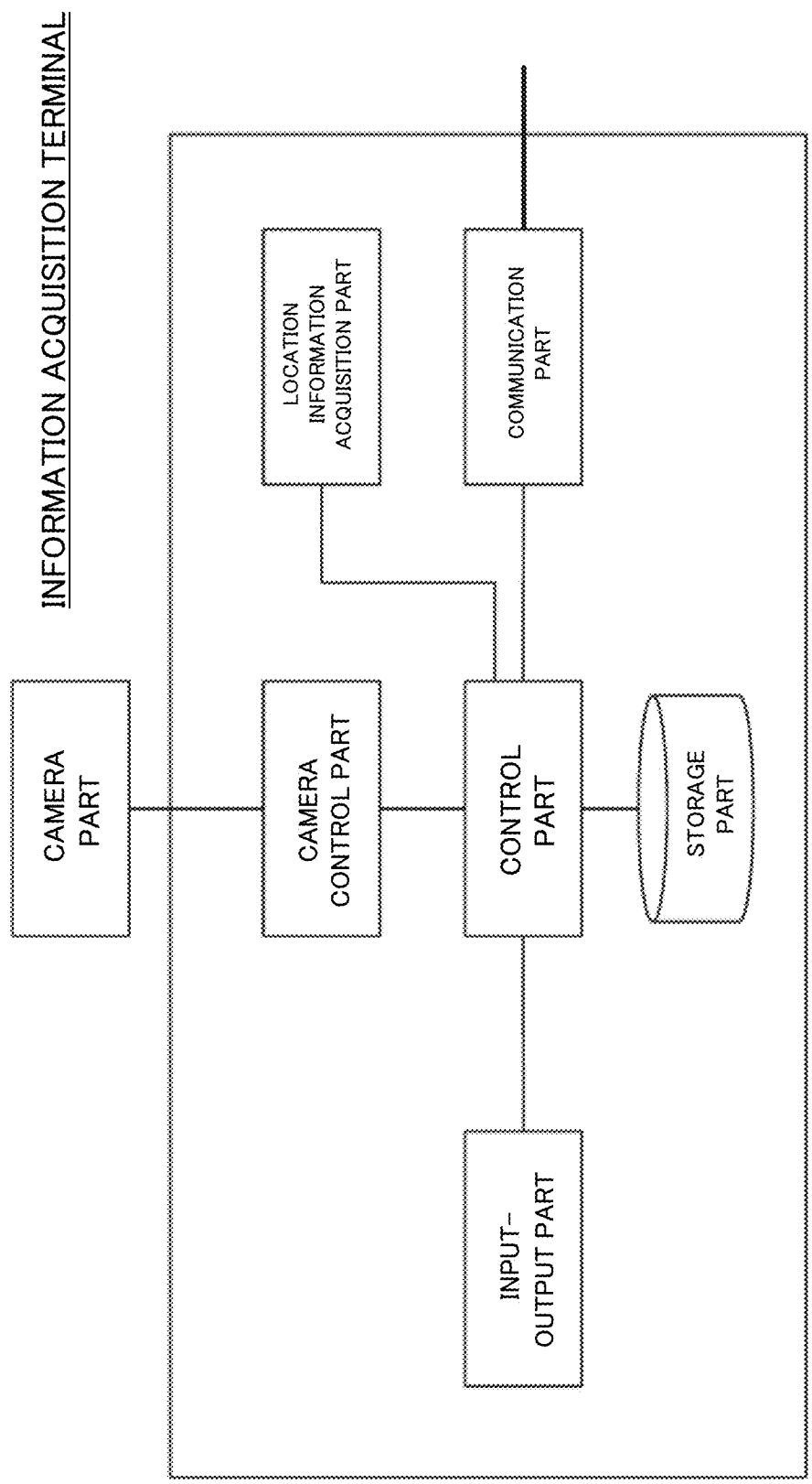
FIG. 23 illustrates an example of a configuration of an information acquisition terminal according to an exemplary embodiment.
Figure 24:
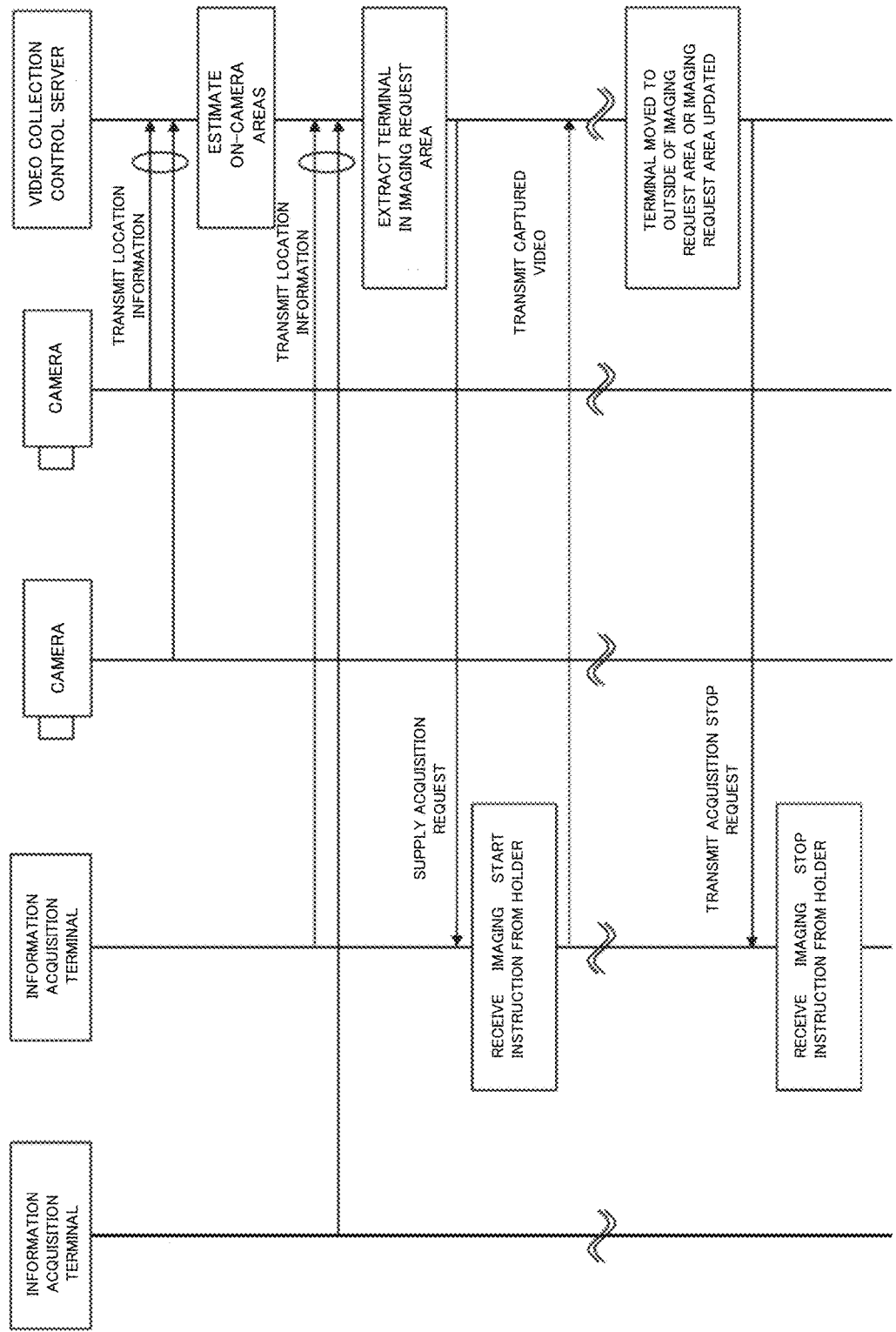
FIG. 24 is a sequence diagram illustrating an example of an operation of a video collection system according to an exemplary embodiment.
Figure 25:
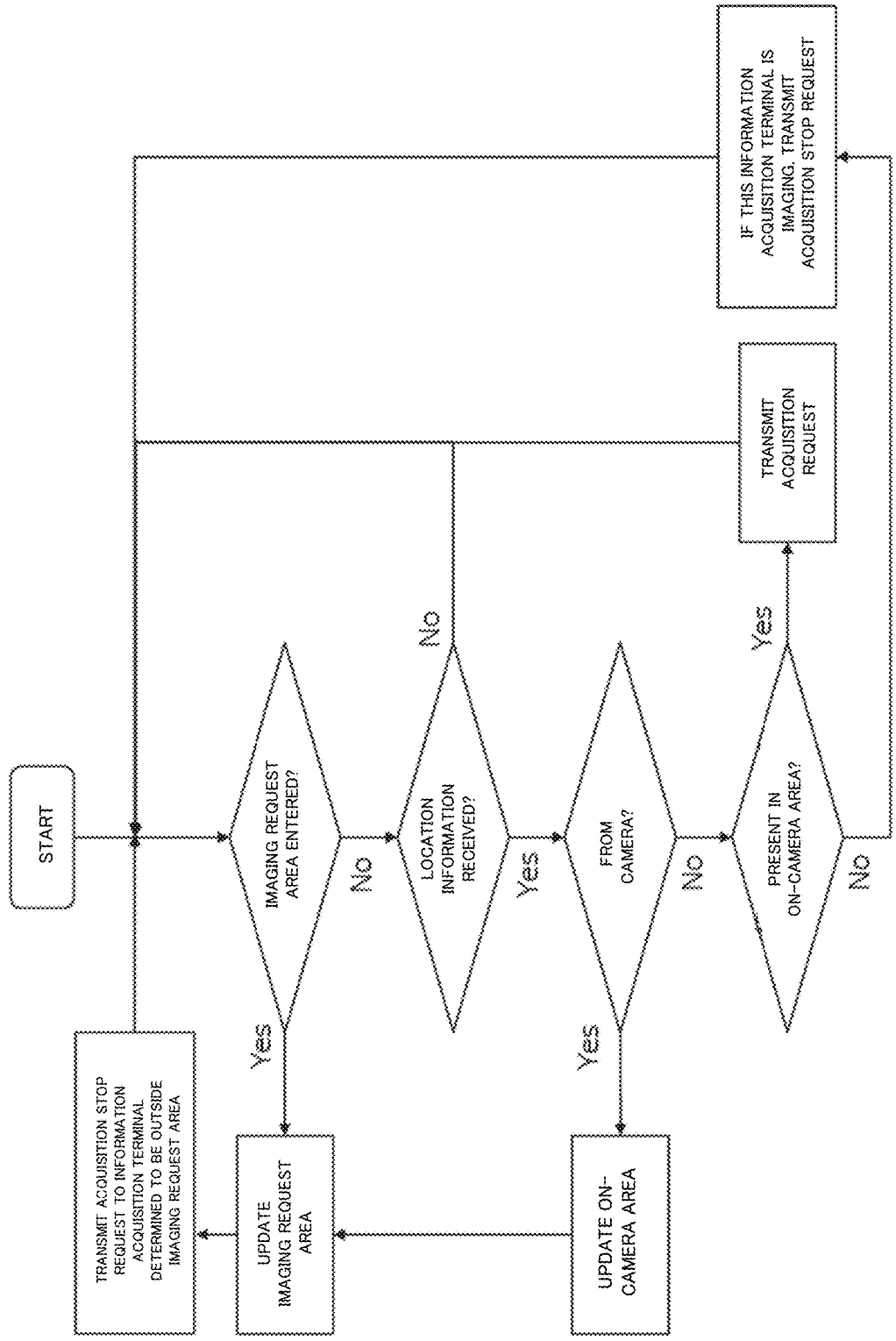
FIG. 25 is a flowchart illustrating an example of an operation of a video collection control server according to an exemplary embodiment.

FIG. 20 illustrates an example of a processing configuration of a video collection server 40 according to the fifth exemplary embodiment. As illustrated in FIG. 20, a message generation part 205 is added to the video collection server 40 illustrated in FIG. 5.

The message generation part 205 generates a message to be transmitted to a terminal(s) 30 based on an operation (an instruction) entered by an operator or information obtained in the process of the determination of an imaging request area by the acquisition area determination part 221.

The following example assumes that the operator determines that a vicious criminal has committed a crime in the monitoring target area and the criminal should not be stimulated while checking the video data (the camera images). In this case, the operator enters an instruction requesting prohibition of imaging of the imaging request area to the video collection server 40. If there is a terminal(s) 30 imaging the criminal site (imaging request area), the message generation part 205 transmits based on the input, an "imaging prohibition message" prohibiting imaging of the imaging request area to the terminal(s) 30.

The following case assumes that the operator has recognized that an explosion or a fire has occurred by a terrorist attack, an accident, or the like in the monitoring target area. In this case, the operator determines the location of the occurrence of the fire or the like and enters an instruction requesting evacuation from the location to the video collection server 40. Based on the input, the message generation part 205 transmits an "evacuation instruction message" requesting a user(s) not to approach to a certain area from the location of the fire (to evacuate from the location of the fire) to a terminal(s) 30.

Alternatively, the above message may be transmitted, based on the event detected by analyzing the video data. Namely, the message generation part 205 may notify, based on the detected event, a terminal(s) 30 imaging the imaging request area of prohibition of the imaging of the imaging request area or a terminal(s) 30 in the imaging request area of evacuation from the area.

When a terminal 30 (the message processing part 304 thereof) receives the above imaging prohibition message or evacuation instruction message, the terminal 30 displays information notifying the user of the content of the received message. In this case, if the terminal 30 is imaging the imaging request area, the display may be switched from the video being captured by the camera to a map image, and the location of the criminal, an evacuation area, etc. may be displayed.

As described above, the video collection server 40 according to the fifth exemplary embodiment transmits an imaging prohibition message" or an "evacuation instruction message" to a terminal(s) 30, as needed. As a result, it is possible to ensure safety of a person(s) such as a citizen(s) or a volunteer(s) who is an owner(s) of a terminal(s) around the location of a crime and understand the situations of the areas that cannot be imaged by the fixed cameras 10 and the like and an area where an accident or the like has occurred through videos.

The configurations of the video collection systems, etc. according to the above exemplary embodiments are illustrated only as examples, and the system configurations are not limited thereto. For example, the functions of the video collection server 40 may be distributed to and installed in a plurality of apparatuses.

While the above exemplary embodiments assume that a single imaging request area is set in a monitoring target area, a plurality of imaging request areas may be set.

In the above exemplary embodiments, while a terminal(s) 30 (for example, a volunteer(s) who owns a terminal(s) 30) is requested to image an imaging request area, a mobile camera(s) 20 (for example, a security guard(s)) may be requested to image the imaging request area. For example, when there is not an appropriate terminal 30 near an imaging request area or when an accident or the like occurs and it is not appropriate to request a volunteer to perform imaging, it is desirable that a mobile camera(s) 20 be requested to image the imaging request area.

In the above exemplary embodiments, while a terminal(s) 30 is requested to image a video of an imaging request area, the terminal(s) 30 may be requested to capture a photograph(s) or describe and transmit the situation of the area in text.

In the above exemplary embodiments, while wearable cameras attached to security guards, etc. are used as the mobile cameras 20, cameras mounted on drones, etc. may be used as the mobile cameras 20.

As described in the above fifth exemplary embodiments, when an accident or the like occurs in a monitoring target area and when a volunteer(s), etc. who owns a terminal(s) 30 needs to evacuate from the area, it is desirable that a terminal(s) different from the terminal(s) 30 (a terminal(s) not registered in advance and a terminal(s) to which necessary software is not installed in advance) be notified of an evacuation instruction. Specifically, the evacuation instruction may be given via a security guard(s) or by broadcasting/announcement or the like.

While a plurality of steps (processing) are described sequentially in the plurality of flowcharts used in the above description, the sequences of the steps in the exemplary embodiments are not limited to those described above. In the exemplary embodiments, for example, the sequence of the steps illustrated may be changed as long as the change does not cause trouble. For example, individual processing may be performed in parallel. Matter described in the above exemplary embodiments may be combined with each other as long as the combination does not cause contradiction.

All or a part of the above exemplary embodiments can be described, but not limited to, as follows.

[Note 1]

See the video collection system according to the above first aspect.

[Note 2]

The video collection system according to note 1; wherein the terminal(s) generates an imaging request screen(s) that requests a user(s) to image the second area(s) based on a request(s) from the video collection server.

[Note 3]

The video collection system according to note 2;

wherein the request part transmits information about a direction(s) in which the selected terminal(s) images the second area(s) to the selected terminal(s); and wherein the terminal(s) generates the imaging request screen(s) by using the direction(s) in which the terminal(s) images the second area(s).

[Note 4]

The video collection system according to note 3;

wherein the request part selects a plurality of terminals requested to perform the information provision from the plurality of terminals; and wherein, when the request part requests an individual one of the plurality of terminals selected to image the second area(s), the request part controls imaging directions of the plurality of terminals selected so that the imaging directions will not overlap each other.

[Note 5]

The video collection system according to note 3 or 4; wherein the terminal(s) generates the imaging request screen(s) including at least one of information about its (their) own location(s), information about the location(s) of the second area(s), and information about a direction(s) in which the terminal(s) is oriented.

[Note 6]

The video collection system according to any one of notes 2 to 5; wherein the determination part detects an event that has occurred in the first and/or second area(s) based on a result obtained by analyzing video data acquired from at least one of the camera(s) and the terminal(s) requested to image the second area(s) and determines a range(s) of the second area(s) based on a kind of the detected event.

[Note 7]

The video collection system according to note 6;

wherein the request part transmits at least one of information about the range(s) of the second area(s), information about the detected event, and information about an imaging target(s) included in the second area(s) to the terminal(s); and wherein the terminal(s) generates the imaging request screen(s) based on a content(s) included in the transmitted information.

[Note 8]

The video collection system according to note 6 or 7; wherein the video collection server further includes a notification part that notifies, based on the detected event, a terminal(s) imaging the second area(s) of prohibition of the imaging of the second area(s) or notifies a terminal(s) in the second area(s) of evacuation from the second area(s).

[Note 9]

The video collection system according to any one of notes 2 to 8; wherein the determination part determines the second area(s) based on externally entered information.

[Note 10]

The video collection system according to any one of notes 2 to 9; wherein the terminal(s) notifies a user(s) of creation of the imaging request screen(s) by using a sound and/or vibration.

[Note 11]

The video collection system according to any one of notes 1 to 10; wherein the terminal(s) transmits a photograph(s) or text about the second area(s) to the video collection server.

[Note 12]

See the video collection server according to the above second aspect.

[Note 13] See the video collection method according to the above third aspect.

[Note 14]

See the program according to the above fourth aspect.

The modes in notes 12 to 14 can be expanded in the same way as the mode in note 1 is expanded to the modes in notes 2 to 11.

In the disclosure of the present application, the following modes are also possible.

Solutions

The video collection control server acquires location information and imaging directions from monitoring cameras (fixed cameras and/or mobile cameras) including location information acquisition parts. Based on the previously stored imaging ranges of the individual monitoring cameras, the video collection control server estimates an imaging request area(s) in which an operator wishes to request an information acquisition terminal(s) to perform imaging and displays the imaging request area(s) on a map.

Likewise, the video collection control server may detect occurrence of a crime or an accident by using a video analysis technique and determine an area in a certain range as an imaging request area based on a content or a kind of the crime or the accident.

A person in charge of security may enter the content or the kind of the crime or the accident to the video collection control server and determine an imaging request area(s) based on a content(s) entered. A person in charge of security may specify an imaging request area(s). An information acquisition terminal(s) held by a citizen(s), a volunteer(s), etc. regularly notifies the video collection control server of location information. When the video collection control server determines presence of an information acquisition terminal(s) in an imaging request area(s) and notifies the information acquisition terminal(s) of an information acquisition request(s), the information acquisition terminal(s) displays the video imaging request(s) on a screen(s). When a recording operation(s) is entered by the holder(s) of the information acquisition terminal(s), the information acquisition terminal(s) transmits a video captured by a camera to the video collection control server.

When an information acquisition terminal has been determined to be outside the corresponding imaging request area, for example, when an information acquisition terminal has moved or the imaging request area has been updated, the video collection control server transmits an acquisition termination notification.

In the above description, while the video collection control server requests imaging of a video, the video collection control server may request acquisition of information other than a video, such as a photograph or explanation of a situation in text (the following description assumes that videos are acquired by the individual terminals).

Advantageous Effects

A situation(s) of an area(s) where no fixed cameras or mobile cameras for security purposes are present and a situation(s) of an area(s) where an accident or a crime has occurred can be understood by viewing a video(s).

While not illustrated, the individual information acquisition terminal notifies the video collection control server of its own location information at certain time intervals previously set.

Hereinafter, a "flowchart performed when a terminal receives an acquisition request or an acquisition termination request" and a "flowchart performed when a terminal receives an operation from its holder" are performed in parallel.

Figure 26:
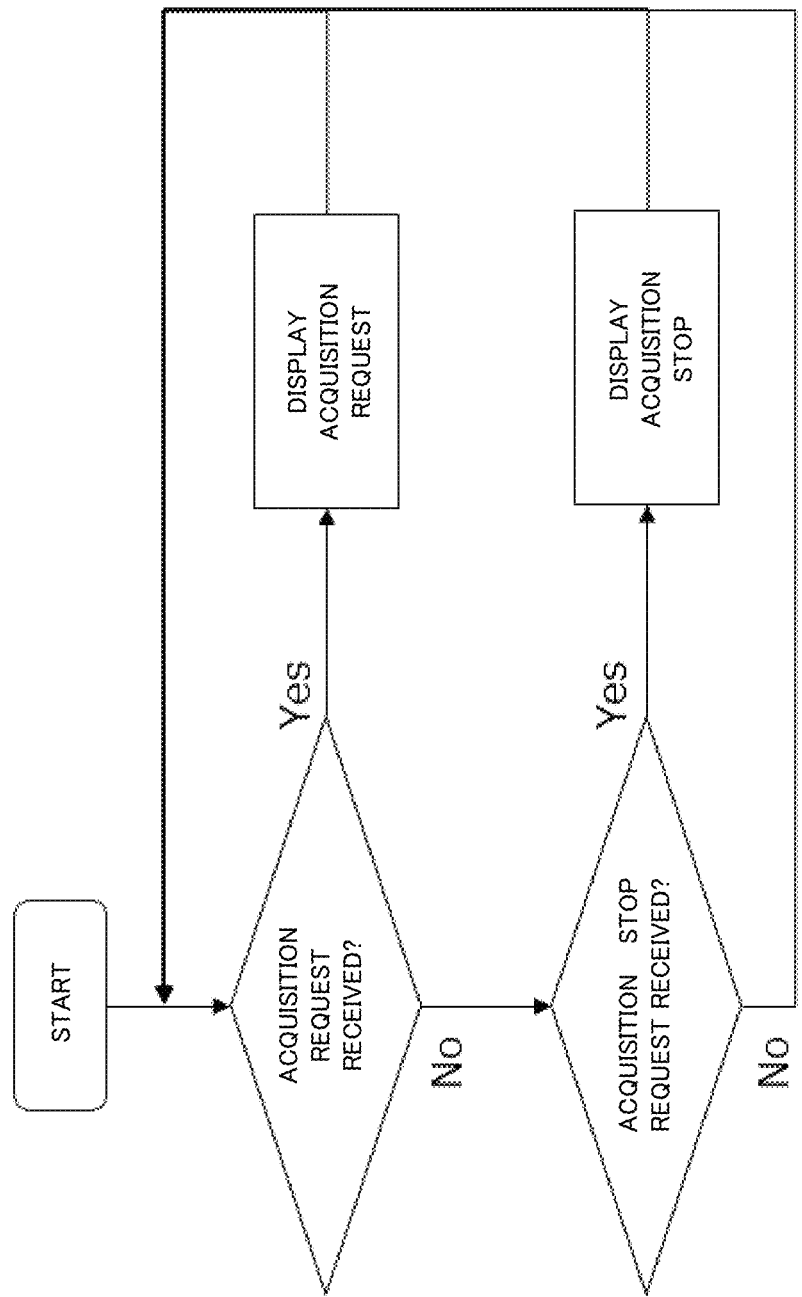
FIG. 26 is a flowchart illustrating an example of an operation of an information acquisition terminal according to an exemplary embodiment.

FIG. 26 is a flowchart performed when a terminal receives an acquisition request or an acquisition termination request.

Figure 27:
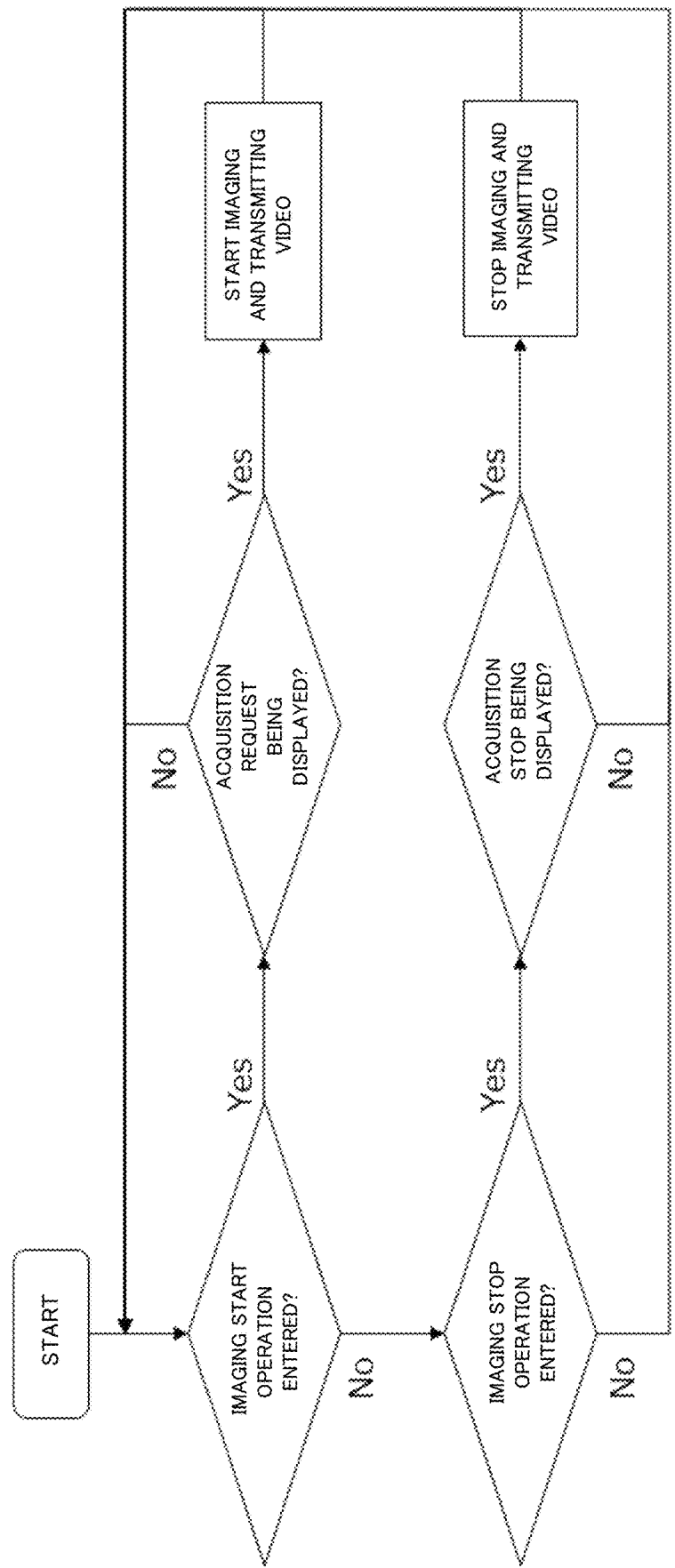
FIG. 27 is a flowchart illustrating an example of an operation of an information acquisition terminal according to an exemplary embodiment.

FIG. 27 is a flowchart performed when a terminal receives an operation from its holder.

Figure 28:
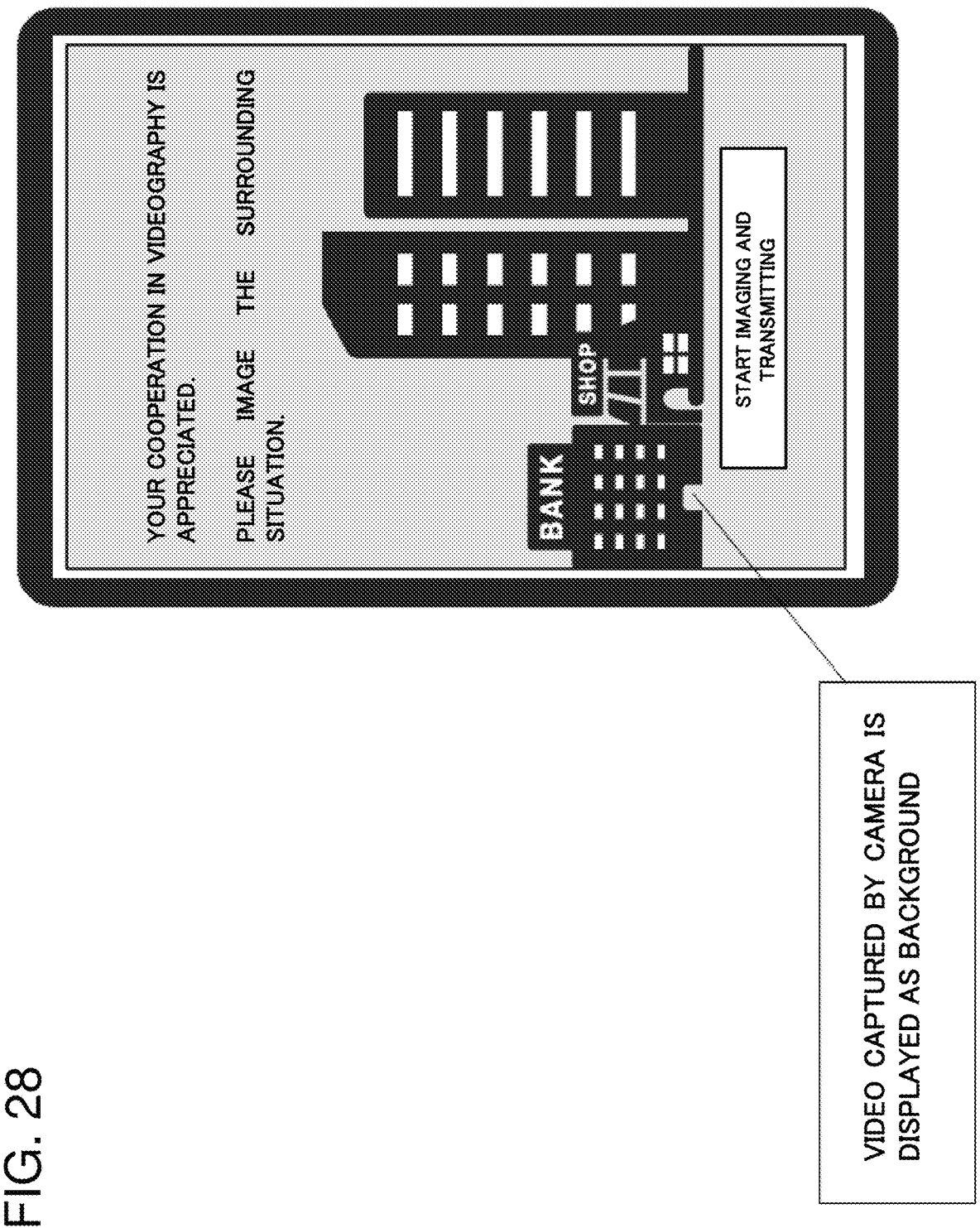
FIG. 28 illustrates an example of a user interface of an information acquisition terminal according to an exemplary embodiment.

Basic User Interface (See FIG. 28)

The basic user interface displays information requesting the user to start imaging a video.

The basic user interface displays an icon (a button) for starting imaging and transmitting.

Others

When an accident or a crime occurs, the basic user interface may display the location of the occurrence and the location of its own information acquisition terminal on a map.

The basic user interface may display a feature or a name of an imaging target object such as a building or a person's face in text.

Example

"Please image the person wearing red clothes."
"Please image "specified name" station."

The basic user interface may display a photograph of an imaging target object such as a building or a person's face.

The basic user interface may specifically display an imaging target object by using a circle, an arrow, or the like.

The basic user interface may display an imaging target object by using a vibration function or an alarm sound provided by its own information acquisition terminal.

Based on the location information transmitted from information acquisition terminals, the video collection control server determines the imaging directions of the individual information acquisition terminals so that the imaging request area can be covered.

The video collection control server transmits an acquisition request including a determined imaging direction to an individual information acquisition terminal present in the imaging request area.

An individual information acquisition terminal includes an electronic compass such as a magnetic sensor, and an individual user interface displays a corresponding imaging direction transmitted by the video collection control server and the location of its own information acquisition terminal on a screen by using a map or the like.

Figure 29:
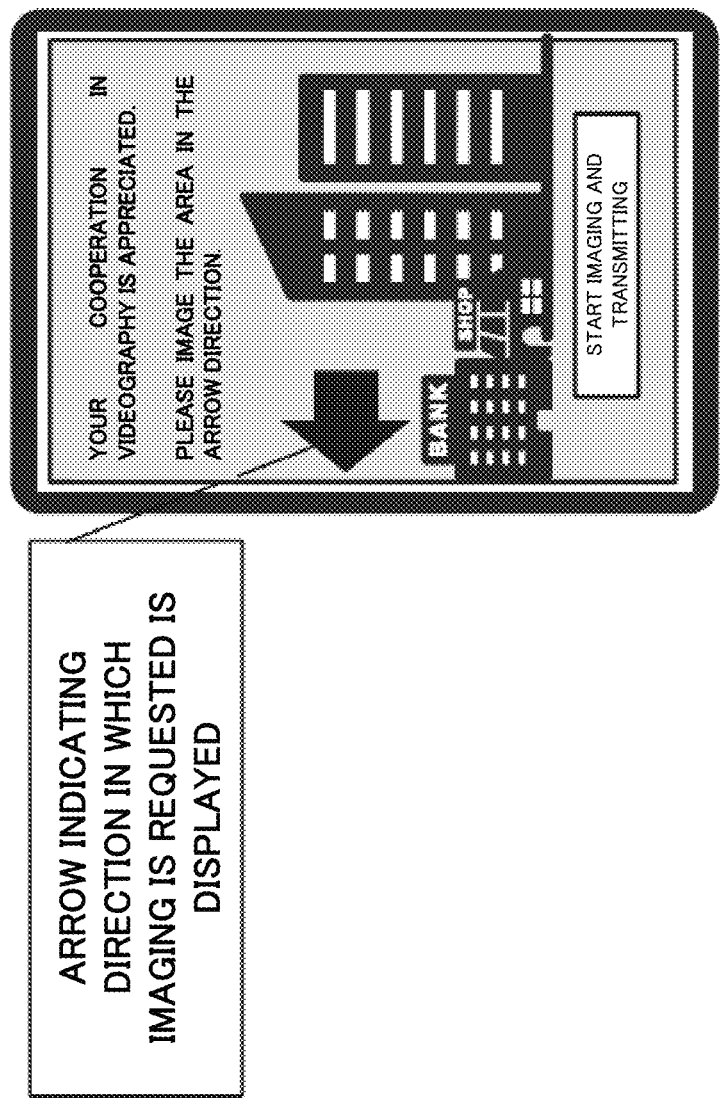
FIG. 29 illustrates an example of a user interface of an information acquisition terminal according to an exemplary embodiment.

As described in the above exemplary embodiments, an individual information acquisition terminal may display a video captured by a camera on its screen and superimpose a corresponding imaging direction on the video with an arrow (see FIG. 29).

In this way, a situation(s) of an area(s) where no fixed cameras or mobile cameras for security purposes are present and a situation(s) of an area(s) where an accident or a crime has occurred can be understood by viewing different videos.

Based on the kind of a crime or an accident that has occurred, the video collection control server may notify a user(s) of an information acquisition terminal(s) of prohibition (termination) of imaging in the imaging request area or evacuation from the imaging request area.

Example 1

In the case of a crime that has been committed by a vicious criminal, the video collection control server notifies a user(s) of an information acquisition terminal(s) of prohibition of imaging, not to stimulate the criminal.

Example 2

When an explosion by a terrorist attack or a fire occurs and when secondary damage is possible, the video collection control server notifies a user(s) of an information acquisition terminal(s) that he/she should not be close to (enter) a certain range from the location of the occurrence of the terrorist attack.

The information acquisition terminal(s) displays a message notifying the user of the above information on its (their) user interface(s). During imaging, the screen(s) displaying the video(s) being captured by the camera(s) may be switched to a map(s), to display an area(s) to which the user(s) should not be close.

By performing the above operations, it becomes possible to understand a situation(s) of an area(s) where there are no fixed cameras or mobile cameras for security purposes or a situation(s) of an area(s) where an accident or a crime has occurred by using videos while ensuring the safety of the surrounding people such as citizens and volunteers having information acquisition terminals.

Figure 30:
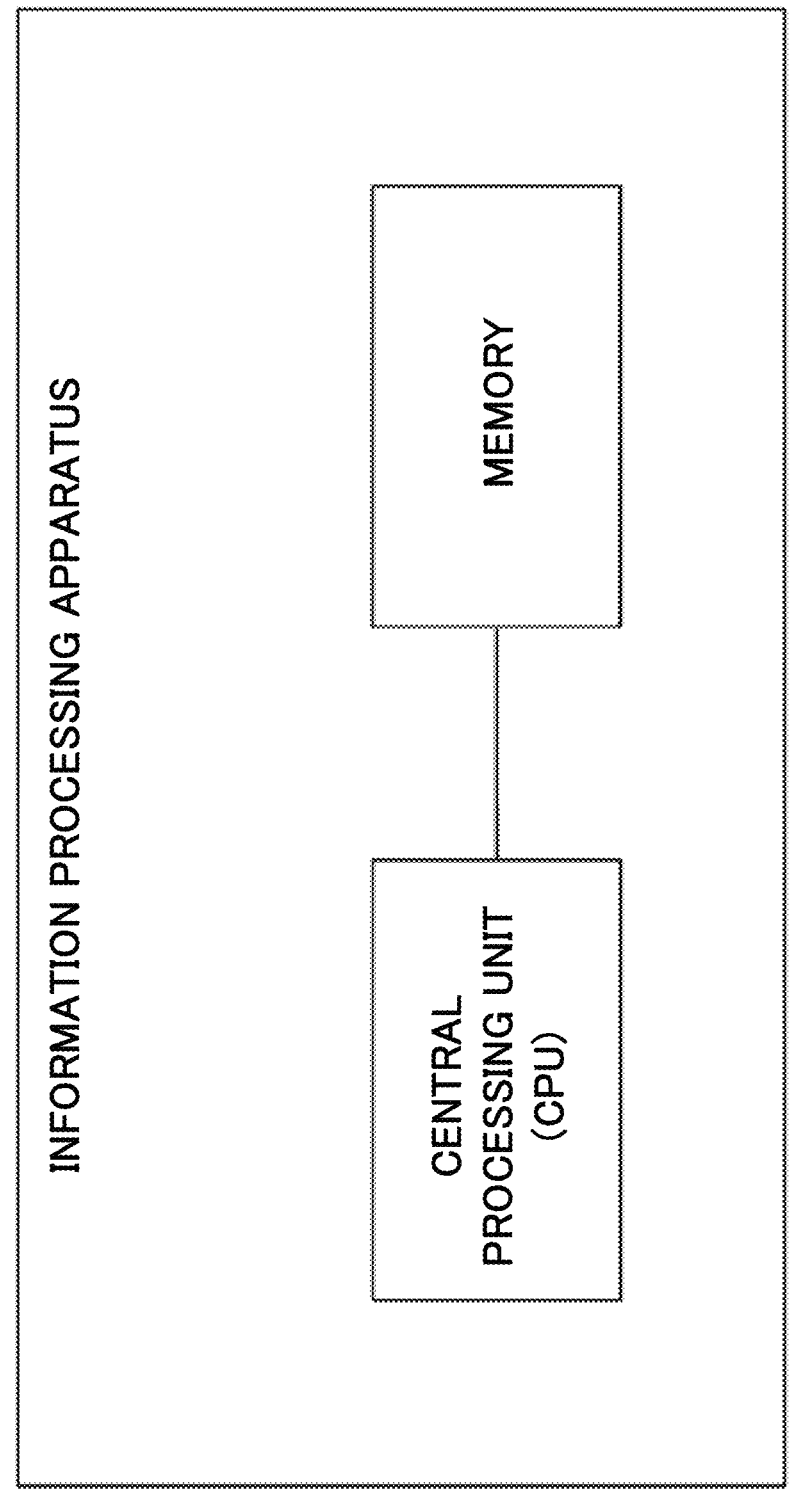
FIG. 30 is a block diagram illustrating an example of a configuration of an information processing apparatus.

FIG. 30 is a block diagram illustrating an example of a configuration of an information processing apparatus. An individual one of the video collection control server and the information acquisition terminals according to the exemplary embodiments may include an information processing apparatus illustrated in FIG. 30. The information processing apparatus includes a central processing unit (CPU) and a memory. The information processing apparatus may realize a part or all of the functions of the components of the corresponding one of the video collection control server and the information acquisition terminals by causing its CPU to execute a program stored in its memory.

Mode 1

A video collection method, including:
  acquiring location information and an imaging direction(s) at predetermined first time intervals from a fixed or mobile monitoring camera(s);
  determining, based on an imaging range(s) of the monitoring camera(s), an imaging request area(s) where an information acquisition terminal(s) including a camera(s) is requested to image a video(s);
  collecting location information from the information acquisition terminal(s) including a camera(s) at predetermined second time intervals;
  transmitting, when it is determined that at least one of the information acquisition terminal(s) is present in the determined imaging request area(s), a video imaging and acquisition request(s) to the corresponding information acquisition terminal(s); and displaying information indicating that the information acquisition terminal(s) that has received the acquisition request(s) is requested to image a video(s) on a screen(s).

Mode 2

The video collection method according to mode 1, including:
  detecting occurrence of an event such as a crime or an accident in a video imaged by at least one of the monitoring camera(s) or a video imaged by at least one of the information acquisition terminal(s) that has received the video imaging and acquisition request(s) by using a video analysis technique; and
  determining, based on a kind of the event that has occurred, a range of a certain distance from the location of the occurrence of the event as an imaging request area.

Mode 3

The video collection method according mode 1 or 2; wherein the kind of the event that has occurred, the location of the occurrence, or the imaging request area is specified externally.

Mode 4

The video collection method according to any one of modes 1 to 3; including:
  determining an imaging direction(s) of the information acquisition terminal(s) determined to be present in the imaging request area(s) so that the imaging direction(s) of the information acquisition terminal(s) will not overlap each other;
  adding the determined imaging direction(s) to a video imaging acquisition request(s) transmitted to the information acquisition terminal(s); and causing the information acquisition terminal(s) that has received the video imaging and acquisition request(s) to detect the direction(s) of its (their) own camera(s) and to display its(their) own location(s) and imaging direction(s) on a map(s).

Mode 5

The video collection method according to any one of modes 1 to 4;
wherein the video imaging and acquisition request(s) transmitted to the information acquisition terminal(s) further includes at least one of information about the range(s) of the imaging request area(s), the location of the occurrence of the event that has occurred, the kind of the event that has occurred, information about an imaging target object(s), and a photograph(s) of the imaging target object(s),
wherein the information acquisition terminal(s) that has received the acquisition request(s) displays, by using the received information, the location(s) of the information acquisition terminal(s), the imaging request area(s), or the location of the occurrence of the event on a map(s), displays information about or a photograph(s) of the imaging target object(s), displays the imaging target object(s) with a circle(s), an arrow(s), or the like, or displays the imaging target object(s) with an alarm sound(s) or a vibration function(s) of the information acquisition terminal(s).

Mode 6

The video collection method according to any one of modes 1 to 5;
wherein, depending on the location or the kind of the event, the information acquisition terminal(s) performing video imaging based on the video imaging and acquisition request(s) is notified of prohibition of the imaging or the information acquisition terminal(s) in the imaging request area(s) of evacuation from the location of the event.

Mode 7

The video collection method according to any one of modes 1 to 6;
wherein the video imaging and acquisition request(s) requests acquisition of a photograph(s) or text describing a situation(s), in place of a video(s).

Mode 8

A video collection system, including a fixed or mobile monitoring camera(s), a video collection control server, and an information acquisition terminal(s) that are connected via a network;
wherein the monitoring camera(s) acquires location information of its(their) own camera(s) and notifies the video collection control server of location information and an imaging direction(s) at predetermined first time intervals;
wherein the video collection control server determines, based on an imaging range(s) of the monitoring camera(s), an imaging request area(s) where the information acquisition terminal(s) is requested to image a video(s) and transmits, when it is determined that at least one of the information acquisition terminal(s) is present in the determined imaging request area(s) based on position information collected from the information acquisition terminal(s), a video imaging and acquisition request(s) to the corresponding information acquisition terminal(s) in the imaging request area(s); and
wherein the information acquisition terminal(s) notifies the video collection control server of location information at predetermined second time intervals and displays, when receiving a video imaging and acquisition request(s) from the video collection control server, information indicating that the information acquisition terminal(s) that has received the acquisition request(s) is requested to image a video(s) on a screen(s).

The disclosure of the above PTLs, etc. is incorporated herein by reference thereto. Variations and adjustments of the exemplary embodiments and examples are possible within the scope of the overall disclosure (including the claims) of the present invention and based on the basic technical concept of the present invention. Various combinations and selections of various disclosed elements (including the elements in the claims, exemplary embodiments, examples, drawings, etc.) are possible within the scope of the overall disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST

10, 10-1 to 10-3 fixed camera
20, 20-1, 20-2 mobile camera
30, 30-1 to 30-4, 101 terminal
40, 102 video collection server
41 CPU (Central Processing Unit)
42 memory
43 input-output interface
44 NIC (Network Interface Card)
44a transceiver circuit
45 camera module
46 GPS (Global Positioning System)
47 geomagnetic sensor
48 speaker
49 vibrator
50 to 52 person
81 to 83 areas
111 calculation part
112 determination part
113 request part
201, 301 communication control part
202 information collection part
203 on-camera area calculation part
204 imaging request area management part
205 message generation part
211 video data collection part
212 location information collection part
221 acquisition area determination part
222 imaging request part
302 location information processing part
303 camera control part
304 message processing part

The invention claimed is:

1. A video collection system, comprising:
a plurality of terminals; and
a video collection server that requests at least one of the plurality of terminals to perform information provision;
wherein the video collection server includes:
a calculation part that calculates, based on information acquired from a camera, a first area imaged by the camera;
a determination part that determines a second area, the second area being different from the first area imaged by the camera, as a target of the information provision based on a location of the first area; and
a request part that selects, based on respective locations of the plurality of terminals and a location of the second area, the at least one of the terminals to be requested to perform the information provision from the plurality of terminals and requests the at least one of the terminals to provide video data of the second area, wherein the request part transmits direction information in which the at least one of the terminals images the second area to the at least one of the terminals, and wherein the at least one of the terminals generates the imaging request screen that requests a user who is holding the at least one of the terminals to image the second area by using the direction information in which the at least one of the terminals images the second area based on a request from the video collection server.

2. The video collection system according to claim 1, wherein the request part selects at least one other one of the terminals to be requested to perform the information provision, and wherein the imaging request screen is generated based on the direction of the at least one of the terminals and other direction information, different than the direction information of the at least one of the terminals, of the at least one other of the terminals, the other direction information being a direction in which the at least one other of the terminals images the second area.

3. The video collection system according to claim 1, wherein the at least one of the terminals generates the imaging request screen including at least one of information about its own location, information about the location of the second area, and information about a direction in which the terminal is to be oriented.

4. The video collection system according to claim 1, wherein the determination part detects an event that has occurred in a monitoring target area based on a result obtained by analyzing video data acquired from at least one of the camera and the terminal requested to image the second area, and determines a range of the second area based on a kind of the detected event.

5. The video collection system according to claim 4, wherein the request part transmits at least one of information about the range of the second area, information about the detected event, and information about an imaging target included in the second area to the at least one of the terminal, and wherein the at least one of the terminals generates the imaging request screen based on a content included in the transmitted information.

6. The video collection system according to claim 4, wherein the video collection server further includes a notification part that notifies, based on the detected event, the at least one of the terminals imaging the second area of prohibition of the imaging of the second area or notifies a terminal existing in the second area of evacuation from the second area.

7. The video collection system according to claim 1, wherein the determination part determines the second area based on externally entered information.

8. The video collection system according to claim 1, wherein the at least one of the terminals notifies a user of creation of the imaging request screen by using a sound and/or vibration.

9. The video collection system according to claim 1, wherein the at least one of the terminals transmits any of a photograph and a text about the second area to the video collection server.

10. The video collection system according to claim 1, wherein the terminals are mobile terminals.

11. A video collection server, which requests at least one of a plurality of terminals to perform information provision, the video collection server comprising:

a calculation part that calculates, based on information acquired from a camera, a first area imaged by the camera;

a determination part that determines a second area, the second area being different from the first area imaged by the camera, as a target of the information provision target based on a location of the first area; and a request part that selects, based on respective locations of the plurality of terminals and a location of the second area, the at least one of the terminals to be requested to perform the information provision from the plurality of terminals and requests the at least one of the terminals to provide video data of the second area, wherein the request part transmits direction information in which the at least one of the terminals images the second area to the at least one of the terminals, and wherein the at least one of the terminals generates the imaging request screen that requests a user who is holding the at least one of the terminals to image the second area by using the direction information in which the at least one of the terminals images the second area based on a request from the video collection server.

12. The video collection server according to claim 11, wherein the request part selects at least one other one of the terminals to be requested to perform the information provision, and wherein the imaging request screen is generated based on the direction of the at least one of the terminals and other direction information, different than the direction information of the at least one of the terminals, of the at least one other of the terminals, the other direction information being a direction in which the at least one of the other terminals images the second area.

13. The video collection server according to claim 11, wherein the at least one of the terminals generates the imaging request screen including at least one of information about its own location, information about the location of the second area, and information about a direction in which the at least one of the terminals is to be oriented.

14. The video collection server according to claim 11, wherein the determination part detects an event that has occurred in a monitoring target area based on a result obtained by analyzing video data acquired from at least one of the camera and the at least one of terminals requested to image the second area, and determines a range of the second area based on a kind of the detected event.

15. The video collection server according to claim 14, wherein the request part transmits at least one of information about the range of the second area, information about the detected event, and information about an imaging target included in the second area to the at least one of the terminals, and wherein the at least one of the terminals generates the imaging request screen based on a content included in the transmitted information.

16. A non-transitory computer readable medium storing a program, causing a computer to perform processing for:

calculating, based on information acquired from a camera, a first area imaged by the camera;

determining a second area, the second area being different from the first area imaged by the camera, as a target used when at least one of a plurality of terminals is requested to perform information provision based on a location of the first area;

selecting, based on respective locations of the plurality of terminals and a location of the second area, the at least one of the terminals to be requested to perform the information provision from the plurality of terminals;

transmitting direction information in which the at least one of the terminals images the second area to the at least one of the terminals; and requesting the at least one of the terminals to provide video data of the second area by causing the at least one of the terminals to generate the imaging request screen that requests a user who is holding the at least one of the terminals to image the second area by using the direction information in which the at least one of the terminals images the second area.

* * * * *